(12) United States Patent
Lim et al.

(10) Patent No.: US 11,906,490 B2
(45) Date of Patent: *Feb. 20, 2024

(54) MICRO GAS CHROMATOGRAPHY SYSTEM

(71) Applicant: Kookmin University Industry Academy Cooperation Foundation, Seoul (KR)

(72) Inventors: Si-Hyung Lim, Seoul (KR); Jang Hyeon Lee, Seoul (KR); Jun Suk Lee, Seoul (KR)

(73) Assignee: KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 688 days.

This patent is subject to a terminal disclaimer.

(21) Appl. No.: 16/391,474

(22) Filed: Apr. 23, 2019

(65) Prior Publication Data

US 2020/0049673 A1 Feb. 13, 2020

(30) Foreign Application Priority Data

Aug. 9, 2018 (KR) ........................ 10-2018-0093346
Mar. 11, 2019 (KR) ........................ 10-2019-0027395

(51) Int. Cl.
*G01N 30/60* (2006.01)
*G01N 30/14* (2006.01)
(Continued)

(52) U.S. Cl.
CPC ......... *G01N 30/6095* (2013.01); *G01N 30/14* (2013.01); *G01N 30/30* (2013.01); *G01N 30/66* (2013.01); *G01N 2030/025* (2013.01)

(58) Field of Classification Search
CPC .................................................. G01N 30/6095
See application file for complete search history.

(56) References Cited

U.S. PATENT DOCUMENTS 3,538,744 A * 11/1970 Karasek ................. G01N 30/92
73/23.39
4,471,647 A * 9/1984 Jerman .............. G01N 30/6095
338/25
(Continued)

FOREIGN PATENT DOCUMENTS

CN 1317986 * 10/2001 ......... G01N 30/6095
JP 2310467 * 12/1990 ......... G01N 30/6095
(Continued)

OTHER PUBLICATIONS

Hyunsung Kang, Ultra-miniaturized urine odor analysis platform based on micro gas chromatography, Creative Commons, Dec. 19, 2016, pp. 3-65, Kookmin University, Seoul, Republic of Korea.

*Primary Examiner* — Jamel E Williams
*Assistant Examiner* — Alex T Devito
(74) *Attorney, Agent, or Firm* — STIP Law Group, LLC

(57) ABSTRACT

Disclosed is a micro gas chromatography system including a fluid feeder for feeding a fluid composed of a carrier gas and a gas mixture containing an analyte component to the next stage, a micro gas preconcentrator chip configured to concentrate and desorb the analyte component contained in the fluid, a micro gas chromatography chip including a micro separation column for separating the analyte component concentrated and desorbed by the micro gas preconcentrator chip, and a micro sensing unit including a micro thermal conductivity detection sensor configured to detect the analyte component separated by the micro gas chromatography chip.

11 Claims, 22 Drawing Sheets

(51) Int. Cl.
*G01N 30/66* (2006.01)
*G01N 30/30* (2006.01)
*G01N 30/02* (2006.01)

(56) References Cited

U.S. PATENT DOCUMENTS

| | | | | |
|---|---|---|---|---|
| 5,970,803 | A * | 10/1999 | Staples | G01N 1/2214 |
| | | | | 73/23.41 |
| 10,551,361 | B2 * | 2/2020 | Lim | G01N 30/18 |
| 2004/0255643 | A1 | 12/2004 | Wise et al. | |
| 2014/0290491 | A1 * | 10/2014 | Kanai | G01N 30/30 |
| | | | | 96/102 |
| 2017/0138912 | A1 | 5/2017 | Zakzeski et al. | |

FOREIGN PATENT DOCUMENTS

| | | | |
|---|---|---|---|
| KR | 20000029874 A | 5/2000 | |
| KR | 1020180035024 A | 4/2018 | |
| WO | WO-03035233 A1 * | 5/2003 | ........... B01D 71/025 |

* cited by examiner (b) Desorption (a)

(a) (b) (c)

(a)

MICRO GAS CHROMATOGRAPHY SYSTEM

CROSS REFERENCE TO RELATED APPLICATION

The present application claims priority to Korean Patent Application No. 10-2018-0093346 (filed Apr. 9, 2018) and No. 10-2019-0027395 (filed Mar. 11, 2019), the entire contents of which is incorporated herein for all purposes by this reference.

BACKGROUND OF THE INVENTION

1. Field of the Invention

The present invention relates to a micro gas chromatography system. The present invention relates to a micro gas chromatography system capable of efficiently concentrating, separating, and detecting each of components of a gas mixture, the system including a micro gas preconcentrator, a micro gas chromatography separation column, and a micro thermal conductivity detection sensor.

2. Description of the Related Art

Gas chromatography (GC) systems are instruments that quantitatively and qualitatively analyze the components of a gas mixture by eluting each of the components of the gas mixture at a different time. A gas chromatography (GC) used to identify each of the components of a gas mixture essentially includes a carrier gas, a sample inlet, a gas separation column, and a detector. Typical examples of the carrier gas include He, $N_2$, $H_2$, Ar, and $CO_2$.

A gas separation column is divided into an inert filling, a solid support (typically made of a diatomaceous earth material), and a stationary phase. A gas mixture (sample) and a carrier gas introduced into a gas separation column undergo interactions such as absorption or dispersion with the inert filling or the stationary phase coated on the inside wall surface of the gas separation column while passing through the gas separation column. Thus, the components of the gas mixture (sample) are separated by leaving the gas separation column at respectively different times.

The time taken for the peak of each component of the sample to be detected by a detector after the sample is introduced into the gas separation column is called "retention time". Since each of the components of a gas mixture has a different retention time while passing through the gas separation column, each of the components is eluted from the gas separation column at a different time. That is, the components of the gas mixture are separately discharged from the gas separation column.

Commercial chemical analysis instruments such as a gas chromatography mass spectrometry (GC-MS) are extensively used. However, such an instrument has many disadvantages: having a large size of several meters; costing several hundred thousand US dollars ($); being difficult to operate; incurring high energy consumption of 2 kW or more; having difficulty and complexity in analysis procedures and methods which require trained/skilled professionals to handle the instruments; having limitations in miniaturization because of a long column length such as 30 m or longer; and requiring a long analysis time.

Therefore, in recent years, there has been developed a portable micro gas chromatography system that can be used without any special knowledge of an operation method thereof. Thus, this portable micro gas chromatography system can be used even by the untrained or skilled. In keeping with this trend, the present invention is intended to provide a micro gas chromatography system that exhibits improved separation efficiency by combining technologies associated with a micro gas preconcentrator based on micro/nano technologies, a micro gas chromatography, and a micro thermal conductivity detection sensor.

Some related arts in the field of the present invention will be briefly described first and then technical matters that differentiate the present invention from the related arts will be described.

Korean patent application publication no. 2000-0029874 (May 25, 2000) discloses an apparatus and method for gas chromatography, in which a sample to be analyzed is injected by an injector and transported by a carrier gas to a chromatography column and the sample is identified by a flame ionization detector.

However, the above-mentioned technology has a disadvantage of an insufficient interaction time between an introduced gas mixture and a stationary phase. Therefore, there is still a need for development of a micro gas chromatography system capable of separating a trace component of a gas mixture.

Accordingly, the inventors of the present application have made intensive efforts to solve the above problems occurring in the related art and as a result, have conceived and completed the present invention, thereby providing a novel micro gas chromatography system including: a micro gas preconcentrator chip for concentrating and desorbing a trace analyte gas; a micro gas chromatography chip having a micro separation column having a specific surface topology to increase the interaction time between a gas mixture and a stationary phase; and a micro thermal conductivity detection sensor having a shortened response time.

DOCUMENT OF RELATED ART (Patent Document)
U. S. Patent Application Publication No. 2017-0138912 (May 18, 2017)
U. S. Patent Application Publication No. 2004-0255643 (Dec. 23, 2004)

SUMMARY OF THE INVENTION

The present invention has been made in view of the problems occurring in the related art and an objective of the present invention is to provide a micro gas chromatography system capable of separating and detecting each trace component (hereinafter, also referred to as analyte gas) contained in a gas mixture by using a micro gas preconcentrator, a micro gas chromatography separation column, and a highly sensitive and responsive micro thermal conductivity detection sensor.

According to one embodiment of the present invention, there is provided a micro gas chromatography system including: a fluid feeder configured to feeding a fluid composed of a carrier gas and a gas mixture containing one or more analyte component to a micro gas preconcentrator chip; the micro gas preconcentrator chip configured to concentrate and desorb each of the analyte components contained in the fluid composed of the carrier gas and the gas mixture; a micro gas chromatography chip into which the analyte components desorbed from the micro gas preconcentrator are introduced and from which the analyte components contained in the fluid are separately discharged; and a micro sensing unit including a gas detector configured to detect the analyte components discharged from the micro gas chromatography chip, wherein the micro gas chromatography chip includes a micro separation column having a rectangular, circular, or serpentine micro-channel that is formed in a surface of a substrate and which is provided with a plurality of bumps formed on an inside wall surface thereof, wherein the bumps are arranged on opposite sides of the inner surface of the micro-channel and the bumps on the opposite sides are alternate with each other.

According to one embodiment of the present invention, the micro gas preconcentrator chip may use, as an absorbent for absorbing the analyte components, at least one of carbon nanotube foam, single walled carbon nanotube, graphitized carbon black, carbon molecular sieve, graphitized polymer carbon, carbon-silica composites, activated carbon, biochar, silica gel, fullerenes, and molecular organic frameworks.

According to one embodiment of the present invention, the micro gas chromatography system may further include a micro heater and a temperature sensor provided on at least one of an upper surface, a lower surface, and a side surface of the micro gas preconcentrator chip.

According to one embodiment of the present invention, the micro-channel may have a channel width of 140 to 200 μm and a channel depth of 300 to 450 μm.

According to one embodiment of the present invention, an $r2/r1$ ratio that is a ratio of a distance $r2$ from a position of the inside wall surface of the micro-channel to a top of the bump that faces the point, with respect to a height $r1$ of the bump may range from 1.0 to 1.5.

According to one embodiment of the present invention, a $d/r1$ ratio that is a ratio of a pitch $d$ of the bumps to a height of the bumps range from 3 to 5.

According to one embodiment of the present invention, the micro gas chromatography chip may use, as a stationary phase, at least one of carbowax, single walled carbon nanotube, polydimethylsiloxane, polyethyleneimine (PEI), diethylene glycol succinate, dinonyl phthalate, ethylene glycol adipate, and β,β-oxydipropionitrile.

According to one embodiment of the present invention, the micro gas chromatography system may further include a micro heater and a temperature sensor provided on at least one of an upper surface, a lower surface, and a side surface of the micro gas chromatography chip.

According to one embodiment of the present invention, the micro gas preconcentrator chip may be mounted in a replaceable micro gas preconcentrator module.

According to one embodiment of the present invention, the gas detector may be a micro thermal conductivity detection sensor.

According to one embodiment of the present invention, the micro thermal conductivity detection sensor may include a heating resistor having a serpentine shape.

According to one embodiment of the present invention, the micro gas chromatography system may further include a controller for controlling operations of the fluid feeder, the micro gas preconcentrator chip, the micro gas chromatography chip, and the micro sensing unit.

According to one embodiment of the present invention, the micro gas chromatography system may further include a display unit that outputs analysis results obtained by the micro sensing unit by using numerals, characters, graphics, diagrams, or any combination thereof.

According to one embodiment of the present invention, the display unit may be a touch screen panel or may be a screen panel equipped with an additional input unit.

According to one embodiment of the present invention, the micro gas chromatography system may further include a communication unit configured to receive statistical data or platform control and setting signals and transmit analysis result data produced by the micro sensing unit to an external device.

According to one embodiment of the present invention, the communication unit may perform wired or wireless communication, wherein the wireless communication is performed using a short-range wireless communication scheme such as Bluetooth, NFC, and infrared technology or a long-range wireless communication scheme such as 3G, 4G, and LTE and Wibro classified as a mobile communication type or WiFi classified as a wireless Internet communication type.

According to one embodiment of the present invention, the micro gas chromatography system may further include a micro transfer column provided at the immediately preceding stage of the micro gas chromatography chip, the micro transfer column adjusting the temperature of the analyte gas to be constant.

The present invention relates to a micro gas chromatography system having a compact and cost-effective design and being capable of concentrating, separating, and detecting a trace analyte component of a gas mixture. The micro gas chromatography system offers precise qualitative and quantitative analysis while maximizing separation efficiency of analyte components of a test sample (gas mixture) introduced into the micro separation column and minimizing the response time of each of the analyte components in the detector.

In addition, since the micro gas chromatography system according to the present invention includes the replaceable micro gas preconcentrator module, troublesome operations such as chamber sealing and wire bonding, which are required in replacing a micro gas preconcentrator chip which is a consumable analytical element, can be omitted. In addition, since the micro transfer column having a temperature control feature is provided at the preceding stage of the micro gas chromatography chip, it is possible to minimize the influence of the temperature of the analyte gas on the micro sensing unit.

BRIEF DESCRIPTION OF THE DRAWINGS

The above and other objects, features and other advantages of the present disclosure will be more clearly understood from the following detailed description taken in conjunction with the accompanying drawings, in which:

FIGS. 3A to 3B are diagrams illustrating an MEMS fabrication method, in which FIG. 3A illustrates a preparation process of a micro gas preconcentrator chip, FIG. 3B illustrates a preparation process of a micro gas chromatography separation column having posts or bumps in a microchannel, and FIG. 3C illustrates a preparation process of a micro thermal conductivity detection sensor;

DESCRIPTION OF THE PREFERRED EMBODIMENTS

Figure 1:
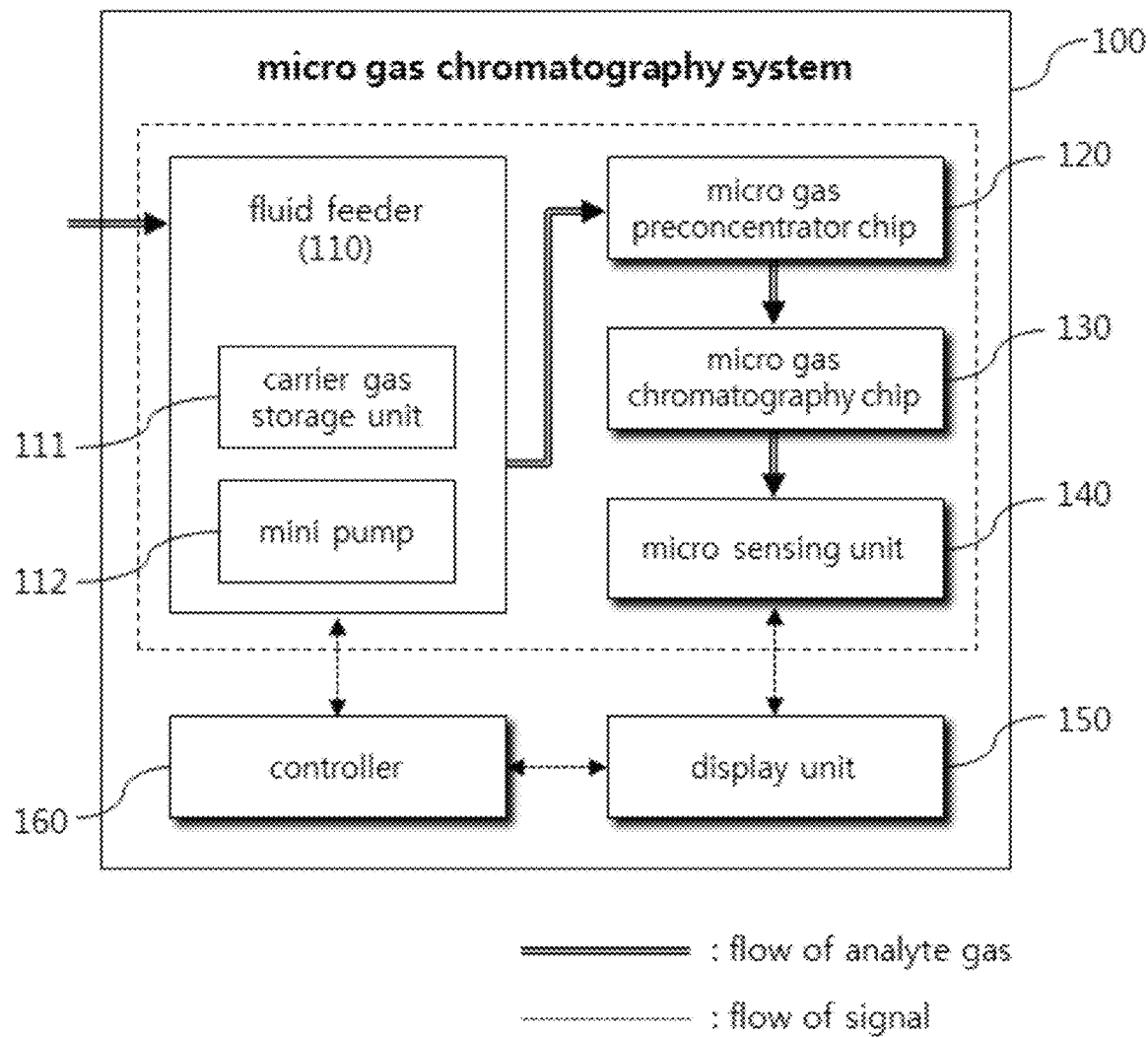
FIG. 1 is a block diagram illustrating the construction of a micro gas chromatography system according to one embodiment of the present invention.

Herein after, preferred embodiments of a micro gas chromatography system according to the present invention will be described in detail with reference to the accompanying drawings so that the ordinarily skilled in the art can easily implement the present invention.

Throughout the drawings, the sizes and dimensions of components are enlarged or reduced from the actual ones in order to clarify the present invention, and the known components are omitted so as to clearly show the characteristic features of the present invention. Therefore, the present invention is not limited to the drawings.

In describing the principles employed in the preferred embodiments of the present invention, well-known functions or constructions will not be described in detail when they may obscure the gist of the present invention.

Although the exemplary embodiments described herein and the configurations illustrated in the drawings are presented for illustrative purposes and do not exhaustively represent the technical spirit of the present invention. Accordingly, it should be appreciated that there will be various equivalents and modifications that can replace the exemplary embodiments and the configurations at the time at which the present application is filed.

A micro gas chromatography system according to the present invention is a micro gas chromatography system capable of concentrating, separating, and detecting trace components of a gas mixture by using a fluid feeder, a micro gas preconcentrator chip, a micro gas chromatography chip, and a highly sensitive and responsive thermal conductivity detection sensor.

FIG. 1 is a block diagram illustrating the construction of a micro gas chromatography system according to one embodiment of the present invention. Referring to FIG. 1, a micro gas chromatography system 100 according to one embodiment of the present invention mainly includes a fluid feeder 110, a micro gas preconcentrator chip 120, a micro gas chromatography chip 130, a micro sensing unit 140, and a display unit 150.

More specifically, when a low-concentration gas mixture (hereinafter, also referred to as a sample gas) containing a trace amount of an analyte component (also, referred to as an analyte gas) is introduced into the micro gas chromatography system 100, the fluid feeder 110 first feeds the gas mixture and a carrier gas to the micro gas preconcentrator chip 120. When a fluid composed of the gas mixture and the carrier gas passes through the channel of the micro gas preconcentrator chip 120, the components of the gas mixture are absorbed by an absorbent provided in the channel. Therefore, the components are concentrated in the micro gas preconcentrator chip 120.

Next, the micro gas preconcentrator chip 120 in which the analyte gas stays in a concentrated state is heated by a micro heater. When reaching a target temperature through the heating, the analyte gas is instantaneously desorbed from the absorbent and is then supplied to the micro gas chromatography chip 130.

The fluid including the analyte gas, supplied to the micro gas chromatography chip 130, chemically or physically interacts with a stationary phase coated on the inside wall surface of the micro separation column of the micro gas chromatography chip 130 while passing through the micro separation column. Due to the interactions, the components contained in the fluid are sequentially and separately discharged from the micro separation column at different times.

Figure 2:
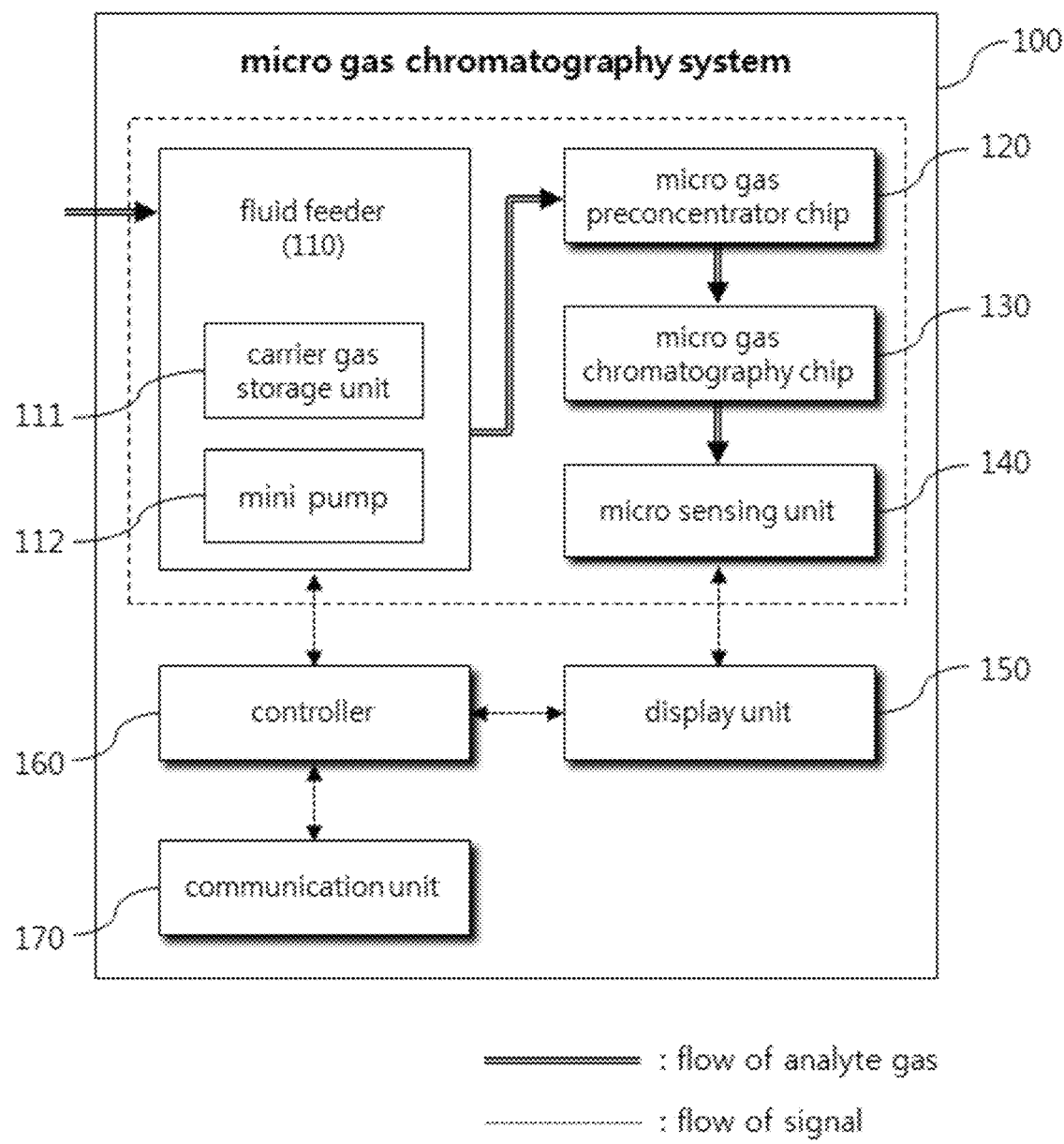
FIG. 2 is a block diagram illustrating the construction of a micro gas chromatography system equipped with a communication unit, according to another embodiment of the present invention.

FIG. 2 is a block diagram illustrating the construction of a micro gas chromatography system having a communication unit, according to another embodiment of the present invention. This micro gas chromatography system 100 includes a communication unit 170 in addition to the construction of FIG. 1. The micro gas chromatography system 100 receives statistical data or signals for controlling the operation of or setting the conditions of the micro gas chromatography system via the communication unit 170 and transmits the analysis results of the micro gas chromatography system to an external device via the communication unit 170.

Figures 3A, 3B, 3C:
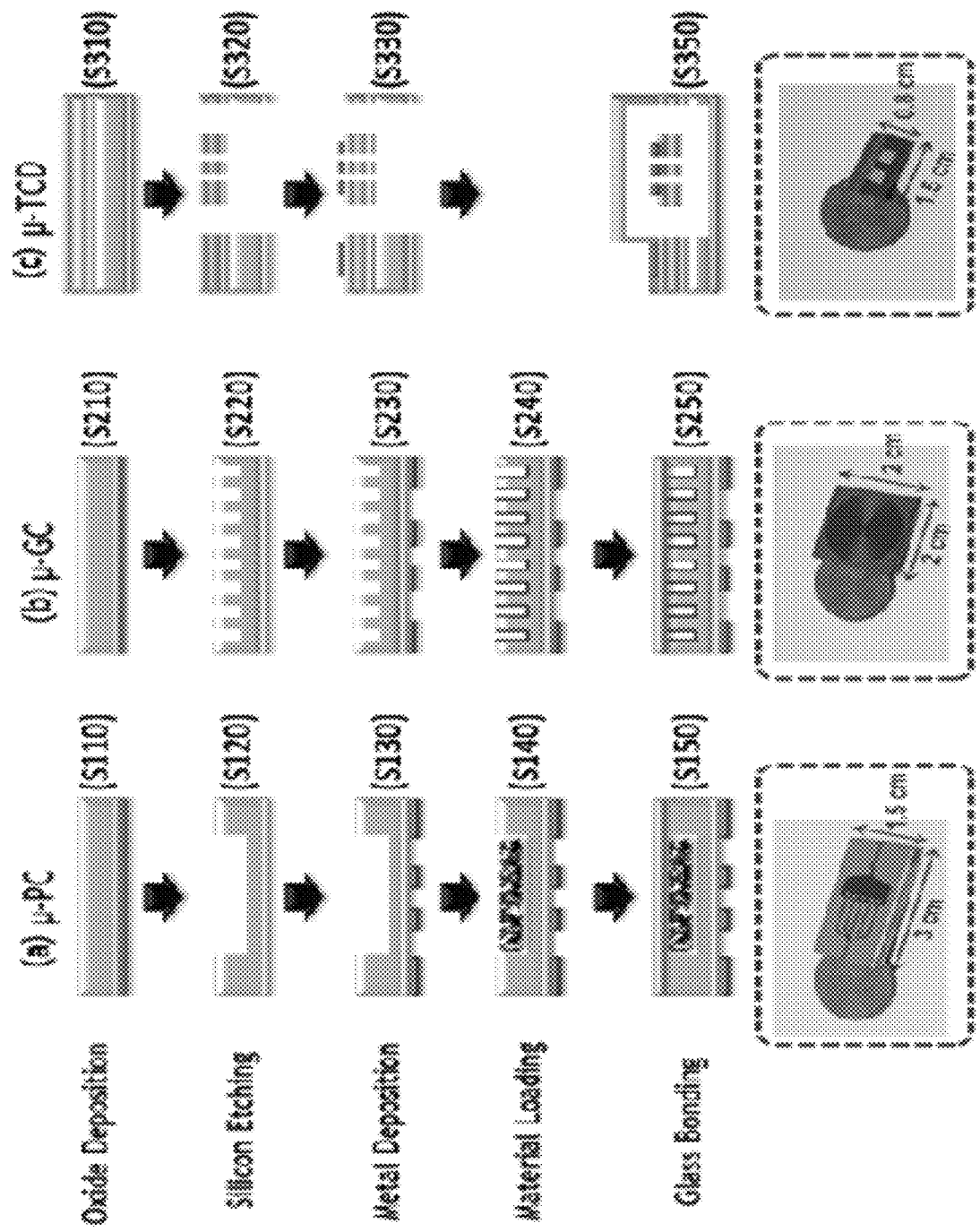

As illustrated in FIGS. 3A to 3C, the micro gas preconcentrator chip 120, the micro gas chromatography chip 130, and the micro sensing unit 140 of the micro gas chromatography system are manufactured by using a micro-electromechanical system (MEMS) fabrication method. The micro gas chromatography system is advantageous in terms of being used without any professional knowledge and being suitable for mobile use.

Hereinafter, the construction of the micro gas chromatography system 100 according to the present invention and a method of manufacturing the same will be described in detail.

The fluid feeder 110 includes a carrier gas storage unit, a miniature pump, and a latching valve. The fluid feeder 110 feeds a gas mixture containing a trace amount of analyte gas to the micro gas preconcentrator chip 120 along with a carrier gas.

The miniature pump is used to feed the analyte gas and the carrier gas at a constant flow rate and constant pressure so that the analyte gas and the carrier gas can be analyzed while passing through the micro gas preconcentrator chip 120 and the micro gas chromatography chip 130 of the micro gas chromatography system 100 according to the present invention.

The latching valve is a three-way valve having an analyte gas inlet, a carrier gas inlet, and a fluid (mixture of the analyte gas and the carrier gas) outlet. The latching valve serves to determine the direction of the flow of the fluid which is the mixture of the analyte gas and the carrier gas.

The micro gas preconcentrator chip 120 is used to concentrate the analyte gas contained at a low concentration in the gas mixture before the analyte gas is separated through the micro gas chromatography. The analyte gas is concentrated to a concentration that can be easily detected by the sensing unit. The fluid including the analyte gas is concentrated by being absorbed into the absorbent while passing through the micro-channel of the micro gas preconcentrator. Since the low-concentration analyte gas is intensively concentrated by the micro gas preconcentrator chip 120 before detection of the analyte gas, the low-concentration analyte gas can be detected with sufficient sensitivity.

The micro gas preconcentrator chip 120 can be manufactured by using a MEMS fabrication method illustrated in FIG. 3A. Specifically, a method of manufacturing the micro gas preconcentrator chip includes an insulation film applying step S110, a chamber forming step S120, a metal-heater/temperature-sensor forming step S130, an absorbent filling step S140, and a glass sealing step S150.

Of the manufacturing method of the micro gas preconcentrator, the insulation film applying step S110 is a process of applying an insulation film on one surface of a silicon substrate. The insulation film may be a silicon oxide film. The insulation film may be famed on the surface of the silicon substrate by a chemical vapor deposition technique or the like. The insulation film preferably has a thickness of 500 to 1500 nm.

The chamber forming step S120 is a process of forming a chamber in the surface of the silicon substrate by using an etching technology. Specifically, the surface of the silicon substrate is etched by sandblasting or the like, resulting in the chamber formed in the surface of the substrate. The chamber is a space to be filled with an absorbent.

In addition, the metal-heater/temperature-sensor forming step S130 is a process of forming a thin metal film pattern on the surface of the silicon substrate coated with the insulation film. The forming step S130 involves metal vapor deposition, photolithography, and lift-off technologies. The thin metal film pattern is made of a conductive material such as a metal. Specifically, the metal is Al, Pt, Cr, Au, or Ti. The thin metal film pattern is formed by performing a photolithography process to form a mask pattern, forming a thin metal film using sputtering, e-beam evaporation, or chemical vapor deposition, and patterning the thin metal film using a lift-off process.

Next, in the absorbent filling step S140, an absorbent is mounted in the chamber formed in the surface of the silicon substrate. Finally, in the glass sealing step S150, an upper glass panel having a gas inlet and a gas outlet is bonded to the upper surface of the silicon substrate with the absorbent mounted in the chamber. The gas inlet and the gas outlet are placed at both sides of the upper glass panel, respectively and connected to gas lines.

The micro preconcentrator chip manufactured through the above-described method has an overall size of 1.5 cm×3.0 cm and a thickness of 0.2 cm, and a space packed with the absorbent has a size of 1.1 cm×0.5 cm with and a depth of 0.15 cm. However, the sizes of the micro preconcentrator chip and the absorbent-packed space are not limited thereto.

Figure 4A:
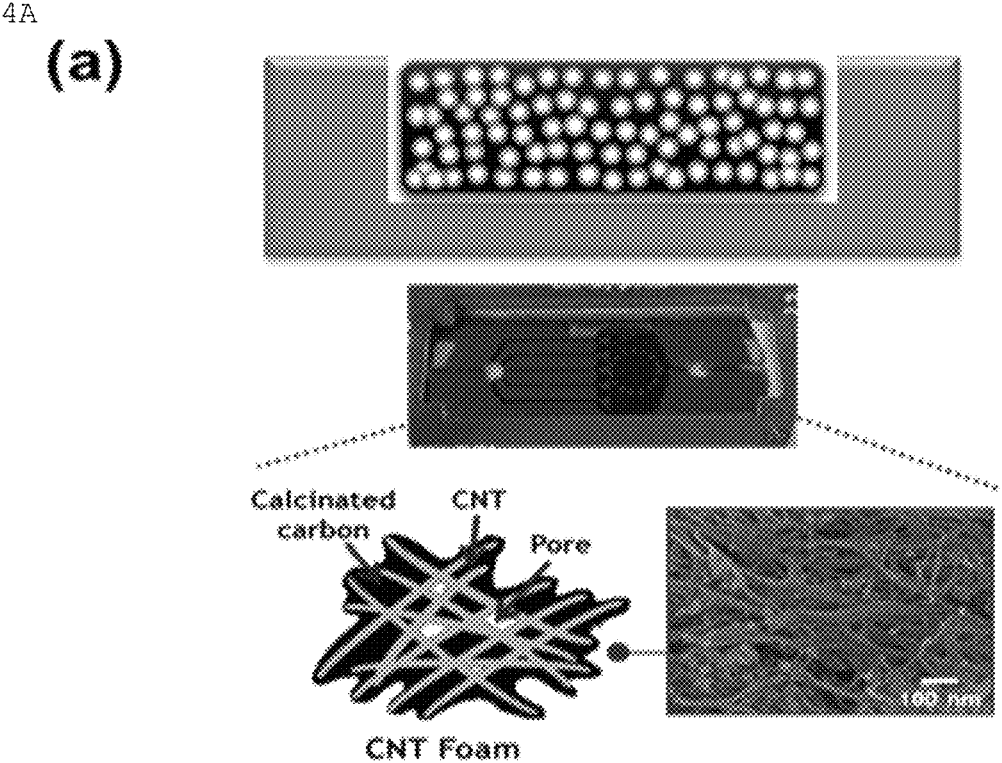
FIG. 4A is a schematic diagram of a micro gas preconcentrator chip filled with a CNT absorbent.

As illustrated in FIG. 4A, the micro gas preconcentrator chip 120 has a form in which the chamber formed in the surface of the silicon substrate is filled with the absorbent. Since the absorbent is required to exhibit excellent absorption performance, it needs to have a design providing a high specific surface area. In addition, the absorbent needs to have a high thermal conductivity to enable an absorbed component to be desorbed instantaneously when heated. Also, a material that can minimize a pressure drop is desirable as a material of the absorbent so that desorbed compounds can be easily discharged from the preconcentrator while consuming a small amount of energy. Specifically, the absorbent may be a gas-absorbing material based on carbon. Preferably, carbon nanotube (CNT) foam, single walled carbon nanotube, graphitized carbon black, carbon molecular sieve, graphitized polymer carbon, carbon-silica composites, activated carbon, biochar, silica gel, fullerenes, or molecular organic frameworks are used as the absorbent.

Figure 4B:
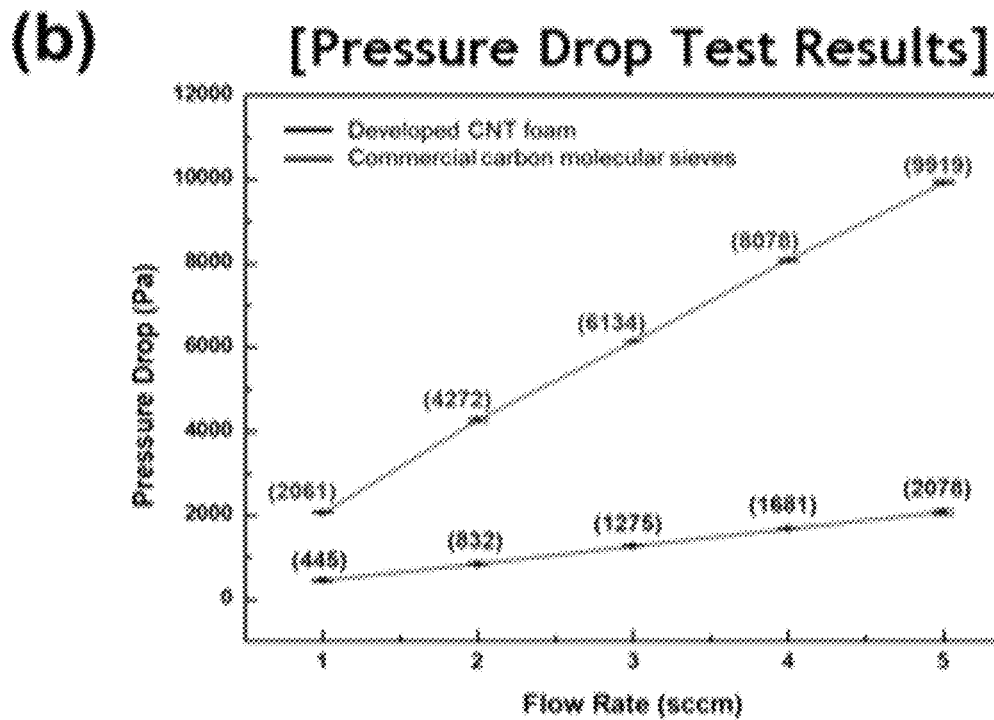
FIG. 4B is a diagram illustrating test results of pressure drop of the micro gas preconcentrator.
Figure 4C:
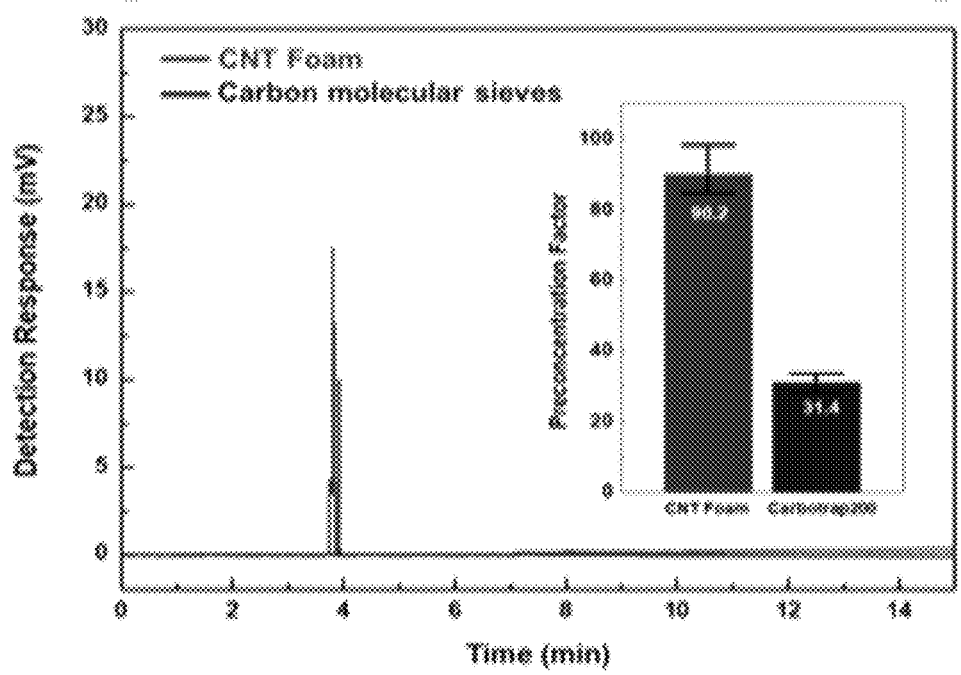
FIG. 4C is a diagram illustrating test results of concentration performance of the micro gas preconcentrator.

In order to confirm that a carbon nanotube foam-based absorbent has better performance than a classical carbon-based absorbent, the pressure drop and the outlet concentration are measured at the outlets of the preconcentrators that respectively use a carbon nanotube foam absorbent and a classical carbon absorbent. The measurement results are shown in FIGS. 4B and 4C. According to the measurement results, when the carbon nanotube foam was used as an absorbent, the pressure drop was decreased and the output concentration was high.

The gas chromatography system includes a three-way solenoid valve controlling the direction of the flow of the analyte gas (unconcentrated gas) and the desorbed gas (concentrated gas) flowing to and flowing out of the micro gas preconcentrator chip 120. The three-way solenoid valve has a fluid inlet for introduction of the fluid composed of the analyte gas and the carrier gas into the micro gas preconcentrator chip, a carrier gas outlet for discharging the carrier gas, and a fluid outlet for discharging the fluid composed of the analyte gas and the carrier gas. The three-way solenoid valve serves to introduce the analyte gas concentrated by the micro gas preconcentrator chip into the micro gas chromatography chip.

In addition, the micro gas preconcentrator chip 120 includes a micro heater serving as a heat source for causing desorption of the concentrated analyte gas and a temperature sensor. The micro heater can be operated only during a desorption mode of the analyte gas, thereby enabling effective heating. Therefore, the micro gas preconcentrator chip can operate at low power consumption and can be implemented in a compact size.

Figure 5A:
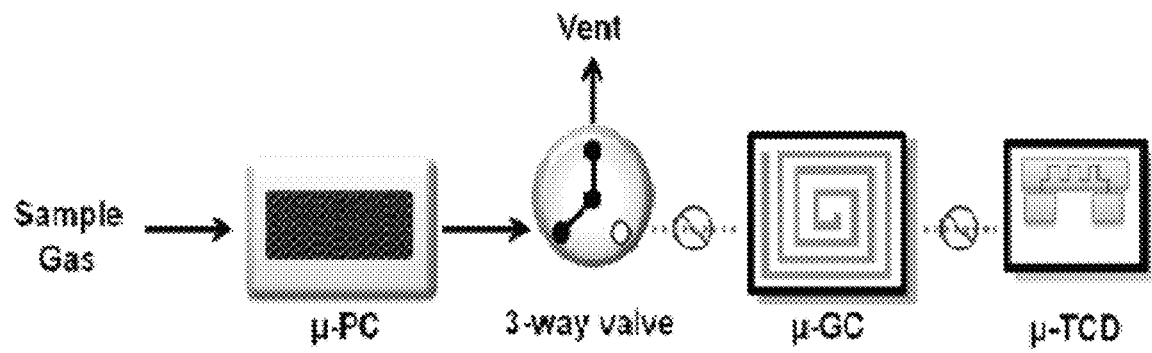
FIG. 5A is a diagram illustrating an adsorption mode in which an analyte gas is absorbed in an absorbent in the micro gas preconcentrator.
Figure 5B:
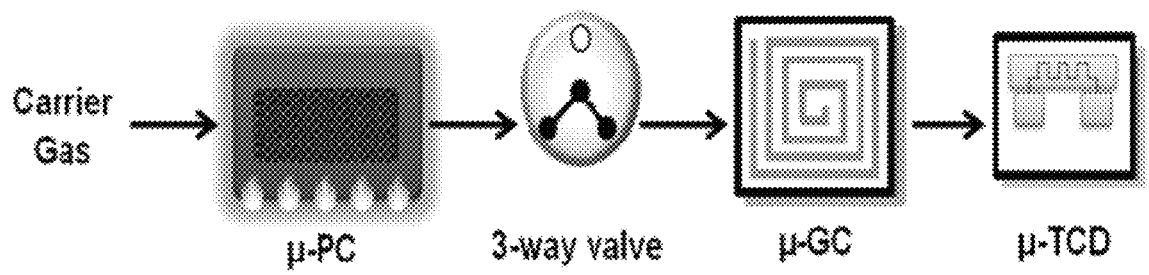
FIG. 5B is a diagram illustrating a desorption mode in which the analyte gas is desorbed from the absorbent in the micro gas preconcentrator.

The micro gas preconcentrator chip 120 has an adsorption mode and a desorption mode as operation modes. As illustrated in FIG. 5A, in the adsorption mode, the low-concentration analyte gas is concentrated by being absorbed by the absorbent mounted in the micro gas preconcentrator chip. On the other hand, in this mode, the carrier gas enters the micro gas preconcentrator chip through the fluid inlet and leaves the micro gas preconcentrator chip through the carrier gas outlet. On the other hand, as illustrated in FIG. 5B, in the desorption mode, the interior of the micro gas preconcentrator is heated by the micro heater. At this time, the absorbed analyte gas is desorbed from the absorbent, and the fluid composed of the analyte gas and the carrier gas flows into the micro gas chromatography chip 130 through the fluid outlet.

Figure 6A:
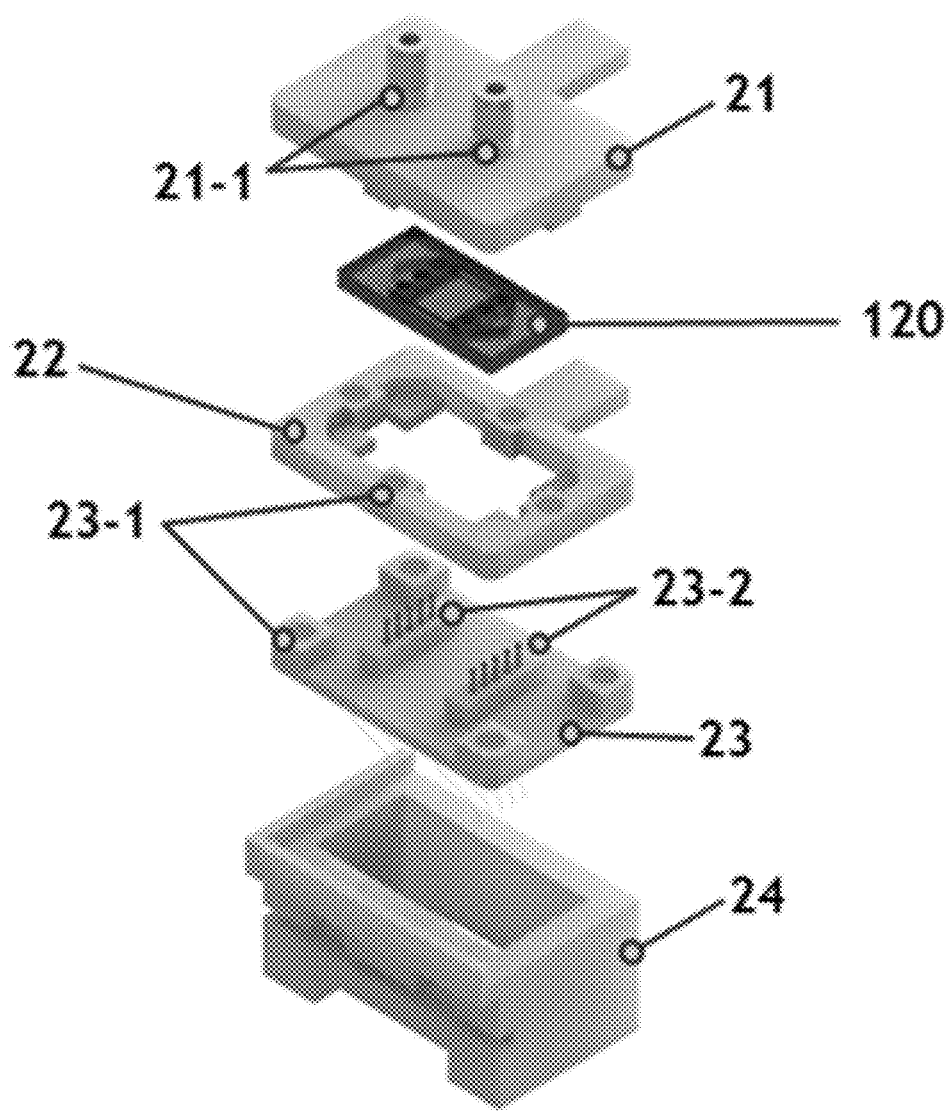
FIGS. 6A, 6B, and 6C are an assembly diagram, an external perspective view, and a cross-sectional view of a replaceable micro gas preconcentrator module mounted in a micro gas chromatography system according to an embodiment of the present invention.

In the micro gas chromatography system 100 according to the present invention, the micro gas preconcentrator chip 120 is assembled in a replaceable micro gas preconcentrator module. Referring to FIG. 6A, the replaceable micro gas preconcentrator module is structured such that the micro gas preconcentrator chip is positioned between an upper cover (21, 21-1) and a lower cover (23, 23-1, 23-2) and is supported on a tray (22, 23-1) for device replacement, which is to be mounted on the upper surface of the lower cover.

Figure 6B:
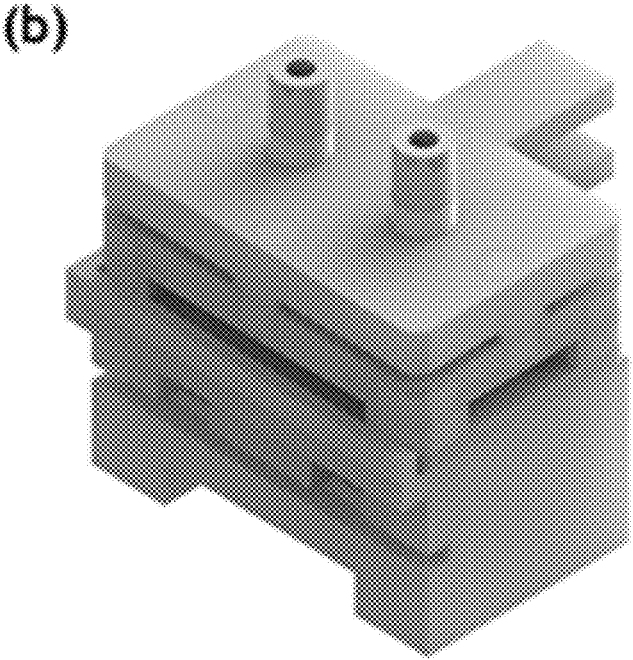
Figure 6C:
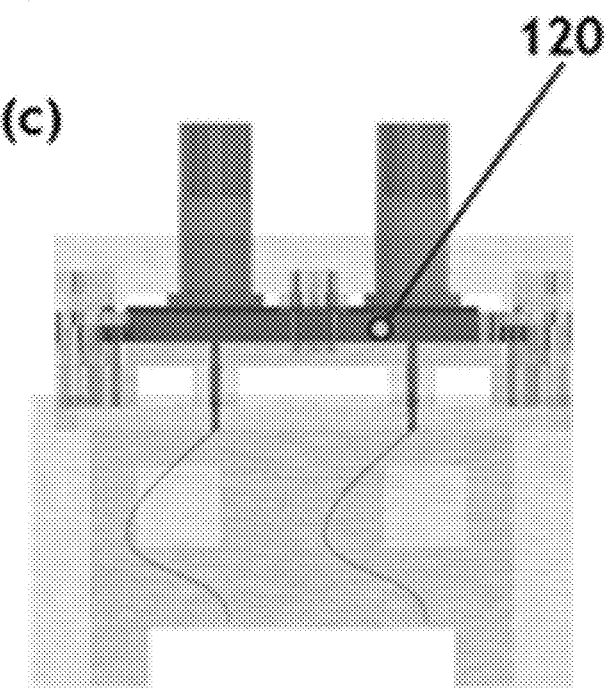

Specifically, as illustrated in FIG. 6B, a micro gas preconcentrator module is fabricated by sequentially assembling a lower body (24), the lower cover, the tray for device replacement, the micro gas preconcentrator chip 120, and the upper cover in this order. With the use of this replaceable micro gas preconcentrator module, troublesome tasks such as chamber sealing and wire bonding that were required in replacing a conventional micro gas preconcentrator can be removed, resulting in improvement in fabrication efficiency.

The micro gas chromatography chip 130 is the subsequent stage of the micro gas preconcentrator chip 120, thereby separate the analyte gases (i.e., the components) contained in the fluid that is supplied from the micro gas preconcentrator 120 after undergoing concentration and desorption in the micro gas preconcentrator 120. When the fluid discharged from the micro gas preconcentrator passes through the micro separation column of the micro gas chromatography chip 130, chemicals (compounds) contained in the fluid interact with the stationary phase provided on the inside wall surface of the micro separation column, thereby being discharged or eluted from the micro separation column at different times. That is, the analyte gases can be separated using the time intervals between the discharges of each of the analyte gases from the micro separation column.

The micro gas chromatography chip 130 can be manufactured by using an MEMS fabrication method illustrated in FIG. 3B. The method of manufacturing the micro gas chromatography chip includes an insulation film applying step S210, a micro-channel forming step S220, a metal-heater/temperature-sensor forming step S230, a stationary phase coating step S240, and a glass sealing step S250. The insulation film applying step S210, the metal-heater/temperature-sensor forming step S230, and the glass sealing step S250 of the manufacturing method of the gas chromatography chip 130 are respectively similar to the insulation film applying step S110, the metal-heater/temperature-sensor forming step S130, and the glass sealing step S150 of the manufacturing method of the micro gas preconcentrator chip.

The micro-channel forming step S220 is an ion etching process to form a micro-channel in one surface of a silicon substrate. A groove to serve as the micro-channel is formed in the surface of the silicon substrate through an etching process and the stationary phase to interact with each of the analyte gases contained in the gas mixture is coated in the micro-channel. The width and the depth of the micro-channel respectively range from 140 to 200 μm and from 300 to 450 μm, but are not limited thereto.

In the stationary phase coating step S240, the stationary phase is coated on the inside wall surface of the micro-channel formed in the surface of the silicon substrate to control the retention times of the respective analyte gases by interacting with the respective analyte gases.

The micro gas chromatography chip 130 manufactured through the method described above includes a micro heater and a temperature sensor for controlling the temperature of the chromatography separation column.

Figure 7A:
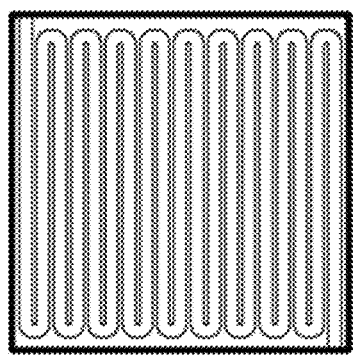
FIGS. 7A, 7B, and 7C are plan views respectively illustrating a serpentine micro-channel, a circular micro-channel, and a rectangular micro-channel of a micro gas chromatography separation column.
Figure 7B:
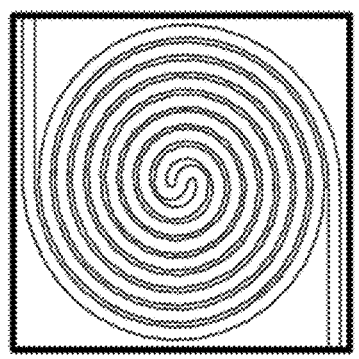
Figure 7C:
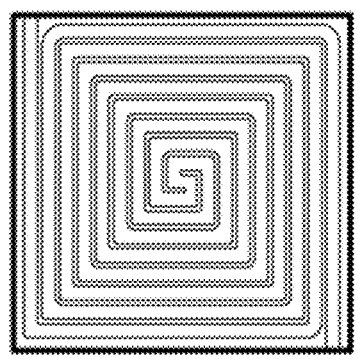

In order to maximize the interaction area between the analyte gases and the stationary phase within the chromatography separation column, the micro-channel in the chromatography separation column may have a serpentine shape (See FIG. 7A), a circular shape (See FIG. 7B), or a rectangular shape (See FIG. 7C). Furthermore, multiple bumps are provided on the inside wall surface. The bumps on opposite sides of the inside wall surface of the micro-channel are alternately arranged.

The term "serpentine" refers to a curved micro-channel illustrated in FIG. 7A. It originates in the S-shape movement of a snake slithering on the ground surface. Due to the serpentine micro-channel, the fluid flows straight in a direction by a predetermined distance, then changes its direction, and then flows straight in the reverse direction.

Figure 8A:
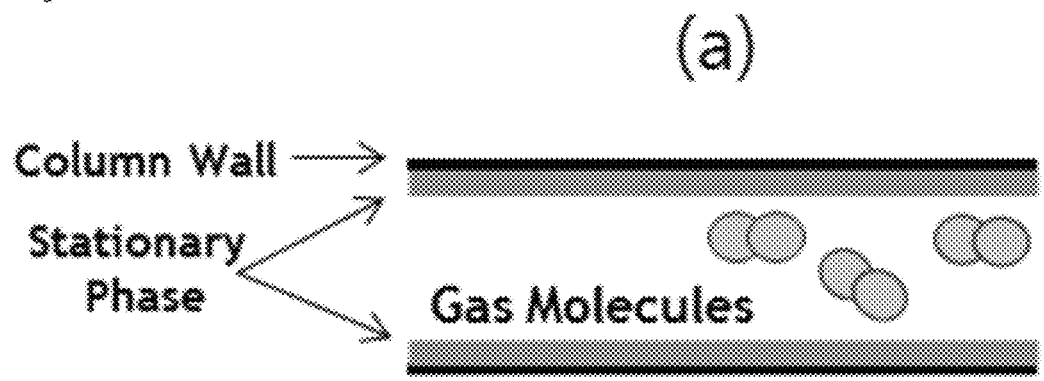
FIGS. 8A, 8B, and 8C are views illustrating test results of separation performance according to the interior structure of the micro-channel of the micro gas chromatography separation column.
Figure 8A:
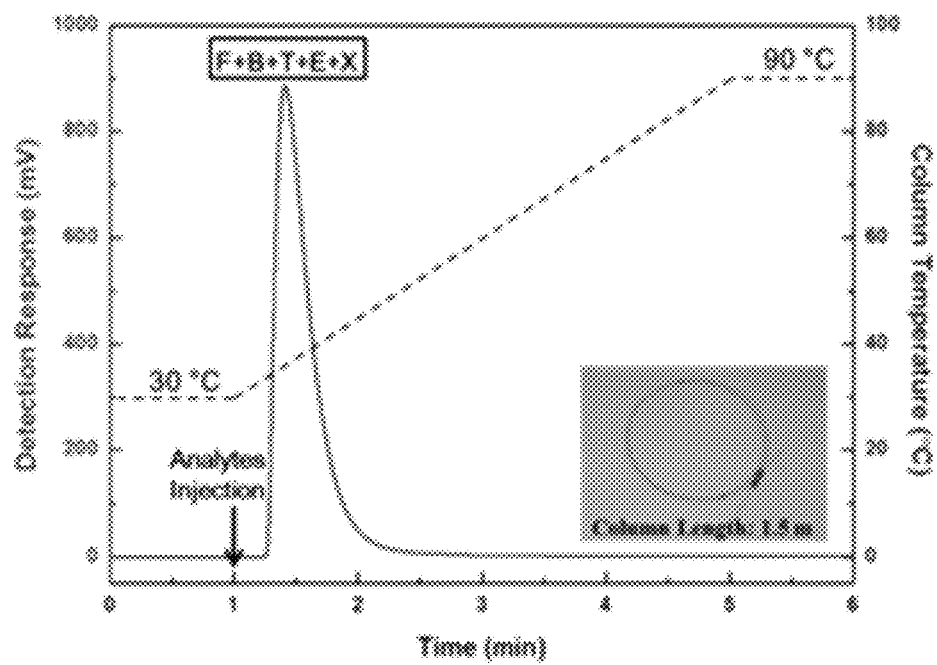
Figure 8B:
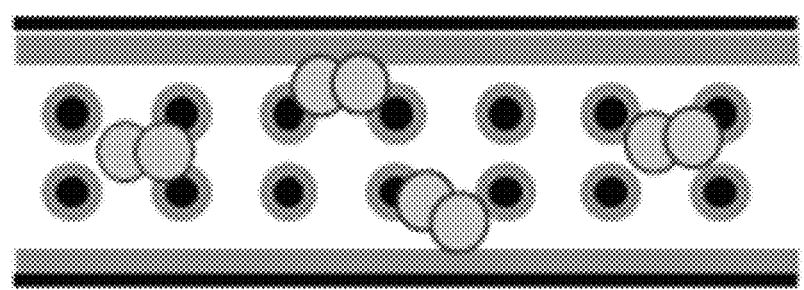
Figure 8B:
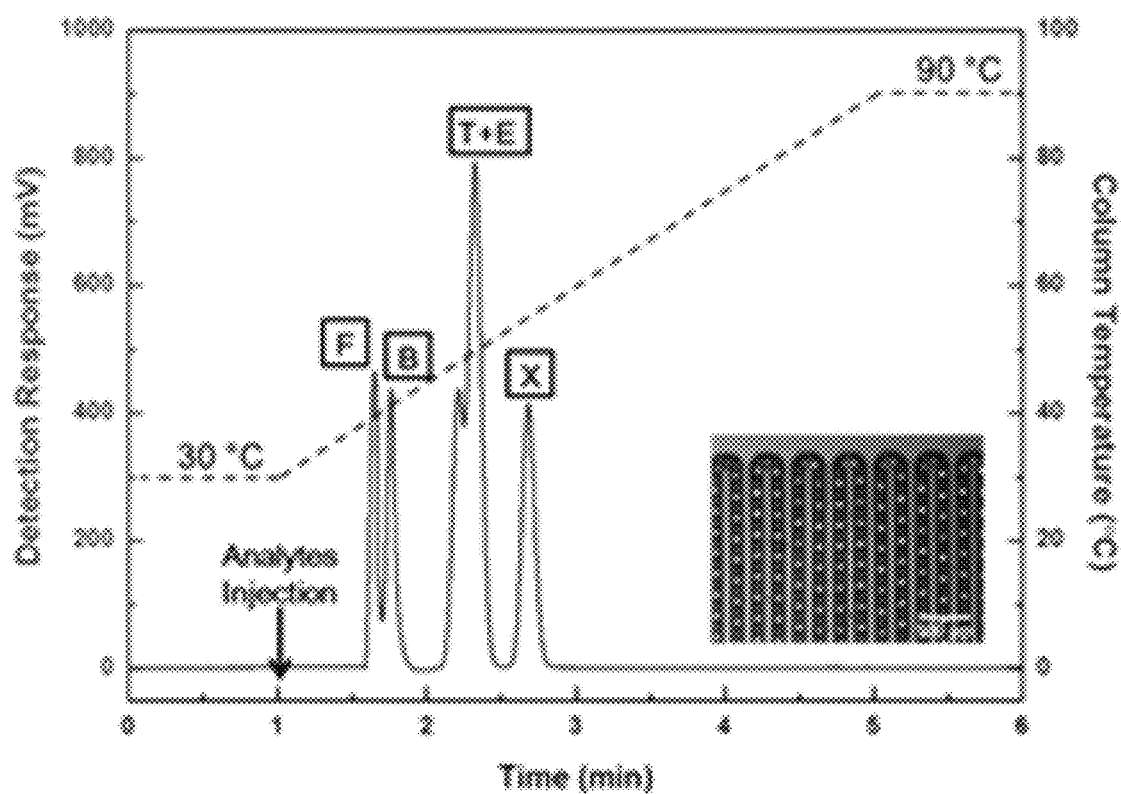
Figure 8C:
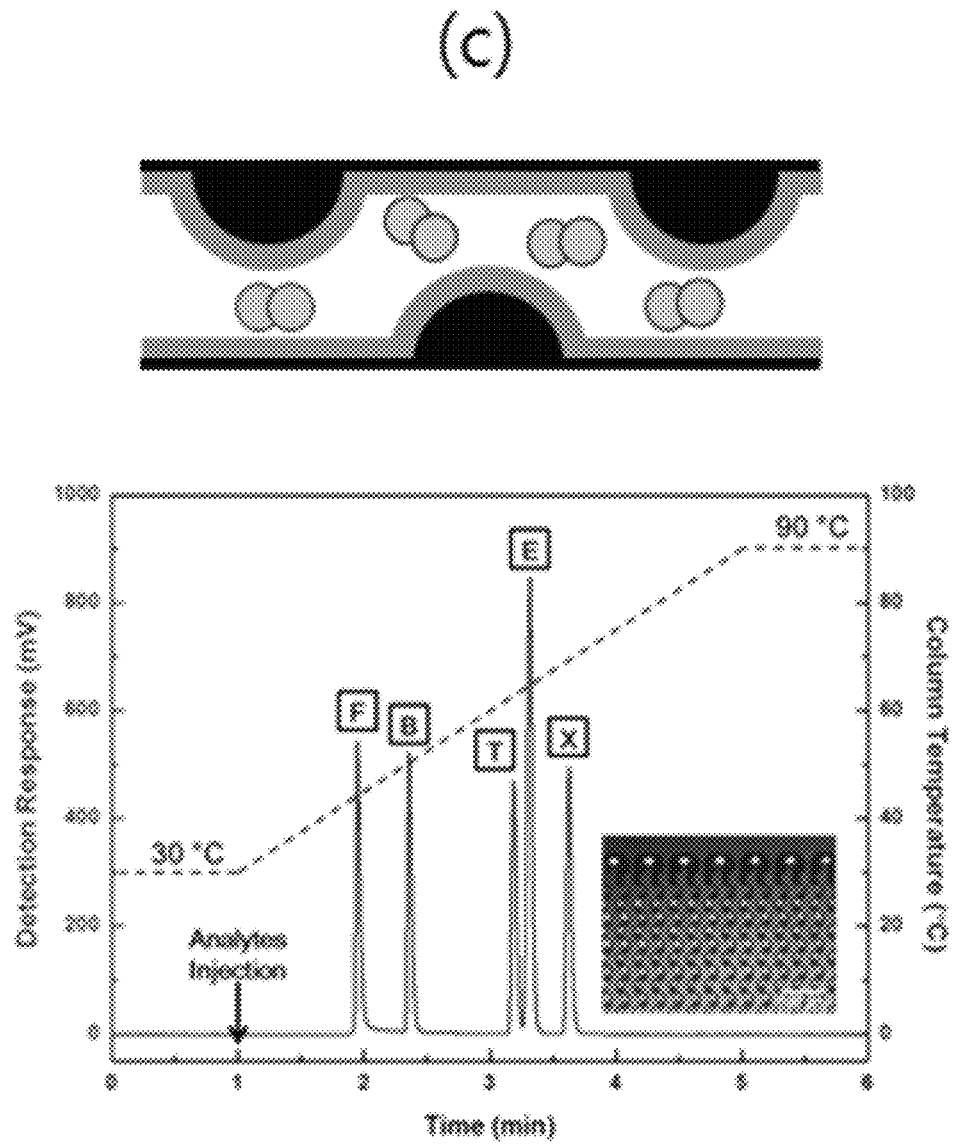

As shown in FIGS. 8B and 8C, obstacles such as posts and/or bumps are formed in the serpentine micro-channel, thereby increasing the pressure drop which is a difference between the inlet pressure and the outlet pressure of a gas that passes through the micro-channel or the separation column. The posts are formed to extend from the upper side and the lower side within the micro-channel. The posts may be positioned at the center of the channel width of the micro-channel. The bumps are provided on the inside wall surface of the micro-channel. The bumps on either one side and the bumps on the opposite side are alternate with each other. However, the arrangement of the posts and bumps is not limited thereto.

Although FIGS. 8B and 8C illustrate examples of the serpentine micro-channel, the shape of the micro-channel is not limited thereto. The micro-channel may be formed in a serpentine shape, a rectangular shape, or a circular shape. In the micro-channel having any one of the serpentine shape, the rectangular shape, and the circular shape, the posts and/or the bumps are arranged in a manner described above.

In order to verity the gas separation effect of the bumps provided in the micro separation column of the micro gas chromatography chip, multiple micro gas chromatography chips respectively having the micro-channels illustrated in FIGS. 8A, 8B, and 8C are fabricated. In the test for verifying the gas separation effect of the bumps, for each component of a FBTEX gas mixture containing formaldehyde (F), benzene (B), toluene (T), ethylbenzene (E), and xylene (X), a separation time and a separation efficiency are measured by a commercial flame ionization detector (FID). In order to select a micro separation column having a high separation performance, a test of comparing gas separation performances of multiple micro separation columns were conducted. In the test, a micro separation column in which a plurality of posts is arranged at a predetermined interval (See FIG. 8B), a micro separation column in which a plurality of bumps is alternately arranged on the opposite sides of the inside wall surface of a micro-channel (See FIG. 8C), and a micro separation column with no obstacles were used (See FIG. 8A).

The detailed test conditions will be described below.

Micro gas chromatography chips used in the test had a size of 20 mm×20 mm and a thickness of 625 μm. They had a total channel length of 1.5 m, a channel width of 150 μm, and a channel depth of 400 μm. In the micro gas chromatography chip having the separation column illustrated in FIG. 8B, each of the posts arranged in the micro-channel was 30 μm in diameter. In the micro gas chromatography chip having the separation column illustrated in FIG. 8C, hemispherical bumps having a diameter of 150 μm were alternately arranged on the opposite sides of the inside wall surface of the micro-channel.

The test to measure the separation performances of the structures of FIGS. 8A to 8C was conducted with a FBTEX gas mixture in which each of formaldehyde (F), benzene (B), toluene (T), ethylbenzene (E), and xylene (X) was contained in a concentration of 200 ppm. In the test, about 100 μl of a test sample (FBTEX gas mixture) was injected at a flow rate of 0.3 ml/min where both of the test sample and a carrier gas (helium) were supplied at that flow rate. The temperature of the separation column was maintained at 30° C. for a first one minute, then increased to 90° C. at a rate of 15° C./min, and then maintained at 90° C. for a last one minute for the test. The total analysis time was 6 minutes, and each gas component was detected by a commercial flame ionization detector (FID).

According to the results shown in FIGS. 8A to 8C, when the inside wall surface of the micro-channel of the micro separation column has no obstacles, the respective analyte gases (gas components) are not separated but detected almost at the same time. However, in the case where posts are provided in the micro-channel and the case where the bumps are formed on the inside wall surface of the micro-channel, the analyte gases were well separated and detected at different times. While toluene and ethylbenzene were detected at almost the same time in the case where the posts are installed in the micro-channel, toluene and ethylbenzene were clearly separated and detected at different times in the case where the bumps are provided in the micro-channel. From these results, it is confirmed that when two columns have the same length, a column provided with bumps on the inside wall surface of a micro-channel thereof exhibits better separation performance due to a higher pressure drop than the other column provided with no bumps.

As the pressure drop is increased, the interaction time for which the introduced fluid stays within the channel increases. Therefore, when a structure capable of causing a larger pressure drop is selected, a gas introduced into a micro gas chromatography chip can be in interaction with a stationary phase provided inside a micro separation column thereof for longer interaction time. This effectively distributes the retention times of (i.e., separation performances for) the components of a gas mixture, thereby enabling a detector to more accurately detect each component of the gas mixture.

That is, when an insufficient pressure drop occurs, interactions between a stationary phase and the components of a gas mixture are also not sufficient, resulting in low separation performance. Conversely, when an excessively large pressure drop occurs, a micro-channel is likely to be clogged, a long analysis time is required, and the operational costs are increased.

Figure 9:
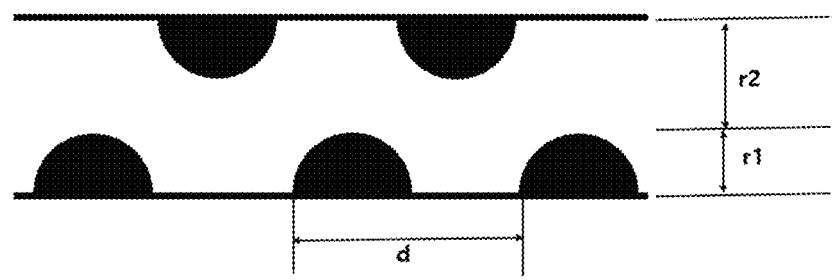
FIG. 9 is a view illustrating a micro-channel of a micro gas chromatography separation column in which multiple bumps are alternately arranged on opposite sides of the wall surface of the micro-channel, according to an embodiment of the present invention.

Next, a detailed description about the bumps will be described. As illustrated in FIG. 9, a ratio $r2/r1$ which is a ratio of a distance $r2$ from the top of a bump to the facing wall surface of the micro-channel with respect to the height $r1$ of the bump preferably ranges from 1.0 to 1.5. When the $r2/r1$ ratio is less than 1.0, since the size of the bump is excessively large compared to the channel width and depth, it is difficult to coat the inside wall surface of the micro-channel with a stationary phase, and there is a high chance that the micro-channel is clogged. On the other hand, when the $r2/r1$ ratio is greater than 1.5, it is difficult to cause a sufficiently large pressure drop. In this case, a micro-channel provided with the bumps does not exhibit superior performance compared to other micro-channels, for example, a micro-channel provided with the posts.

A $d/r1$ ratio that is a ratio of a pitch $d$ of the bumps with respect to the height $r1$ of the bump preferably ranges from 3 to 5. When the $d/r1$ ratio is less than 3, since the bumps are too close, it is difficult to coat the inside wall surface of the micro-channel with a stationary phase, and a interaction between the coated material (stationary phase) and the fluid is not efficient due to a stagnation region formed between the bumps. On the other hand, when the $d/r1$ ratio is greater than 5, since the pitch of the bumps is too large, the pressure drop decreases, resulting in deterioration in separation performance.

The stationary phase provided in the micro separation column of the gas chromatography chip is preferably coated on the inside wall surface of the micro separation column. The stationary phase is formed from carbowax, single walled carbon nanotubes (SWCNT), polydimethylsiloxane (PDMS), polyethyleneimine, diethylene glycol succinate, dinonyl phthalate, ethylene glycol adipate, β,β-oxydipropionitrile, or any combination thereof.

The micro sensing unit 140 detects each of the analyte gases passing through the micro gas chromatography chip 130. The micro sensing unit 140 includes a gas detector capable of sensing a chemical compound from a gas mixture. The gas detector may be a micro thermal conductivity detection sensor.

The micro thermal conductivity detection sensor can be manufactured using a MEMS fabrication method illustrated in FIG. 3C. Specifically, the method of manufacturing the micro sensing unit 140 includes an insulation film applying step S310 in which both principal surfaces of a silicon-oninsulation (SOI) substrate is covered with an insulation film, a patterning step S320, a thin metal film pattern forming step S330, and a glass sealing step S350.

The insulation film applying step S310 is a process of coating both of the principal surfaces of the SOI substrate with an insulation film. The reason of using the SOI substrate rather than a silicon substrate will be described below. When forming a thin film pattern by deeply etching a silicon substrate, unless a precise control of an etching duration and an etching intensity is successful, the thin film is completely etched away. However, when the SOI substrate is used, since an insulation layer is disposed between silicon layers, the insulation layer serves as an etching stopper. Therefore, it is easier to form a thin film pattern.

In the patterning step S320, the SOI substrate with the insulation films on both sides thereof undergoes photolithography and then dry or wet etching. Through these processes, a pattern can be formed on the SOI substrate. The thin metal film pattern forming step S330 of the manufacturing method of the micro sensing unit 140 is the same as the thin metal film pattern forming step S130 of the manufacturing method of the micro gas preconcentrator chip 120. Finally, in the glass sealing step S350, an upper glass panel with a gas inlet and a gas outlet, and a lower glass panel are respectively bonded to the upper surface and the lower surface of the SOI substrate that is coated with the insulation film and provided with the thin metal film pattern. The gas inlet and the gas outlet are placed at both sides of the upper glass panel or the lower glass panel, and are connected to gas lines.

In the glass sealing step S350, relatively less energy (electric energy or thermal energy) is required in bonding a silicon member and a glass member. However, in the case of bonding two silicon members to each other, relatively more energy is consumed. Therefore, it is preferable to seal the micro thermal conductivity detection sensor with a glass cover. Since the glass cover has a considerably lower thermal conductivity than the silicon substrate, it has a heat insulation effect, thereby minimizing the influence of an external temperature on the internal temperature and enabling the detector to highly sensitively respond to changes in the internal thermal conductivity.

The micro thermal conductivity detection sensor manufactured by the method described above has a size of 15 mm×9 mm and a thickness of 0.5 mm, but the size and thickness of the micro thermal conductivity detection sensor are not limited thereto.

Figure 10A:
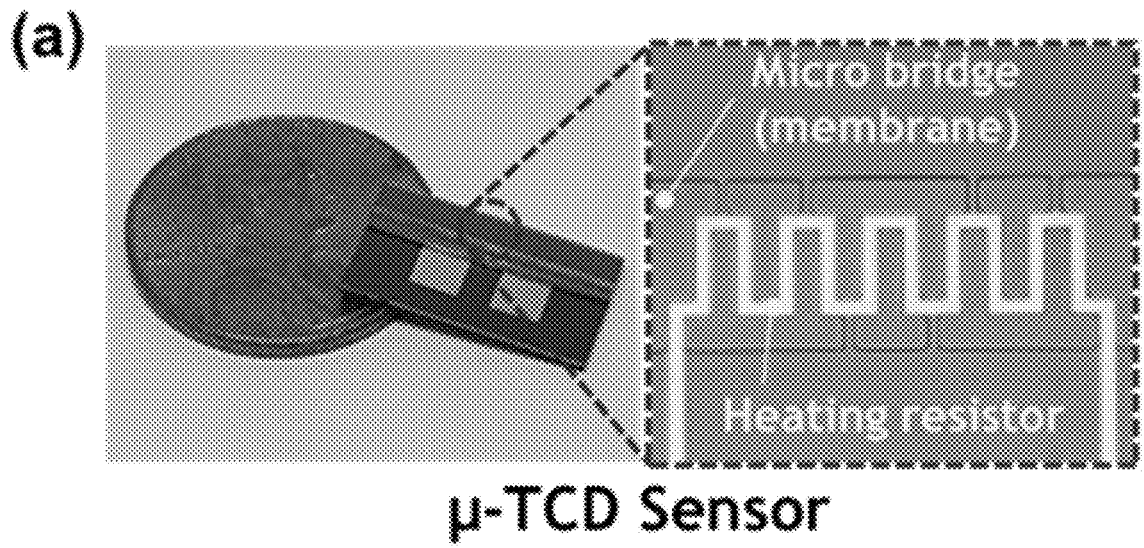
FIG. 10A is a view illustrating the structure of a heating resistor mounted in a micro thermal conductivity detection sensor.

The micro thermal conductivity detection sensor includes a heating resistor. The heating resistor has a serpentine shape and is supported by a micro bridge. This form helps to overcome the limit of a slow response of a general thermal conductivity detection sensor. Specifically, as illustrated in FIG. 10A, the heating resistor is locally densely arranged in a region, which enables a quick arrival at a target operating temperature. This shortens a response time and a recovery time and lowers power consumption.

Figure 10B:
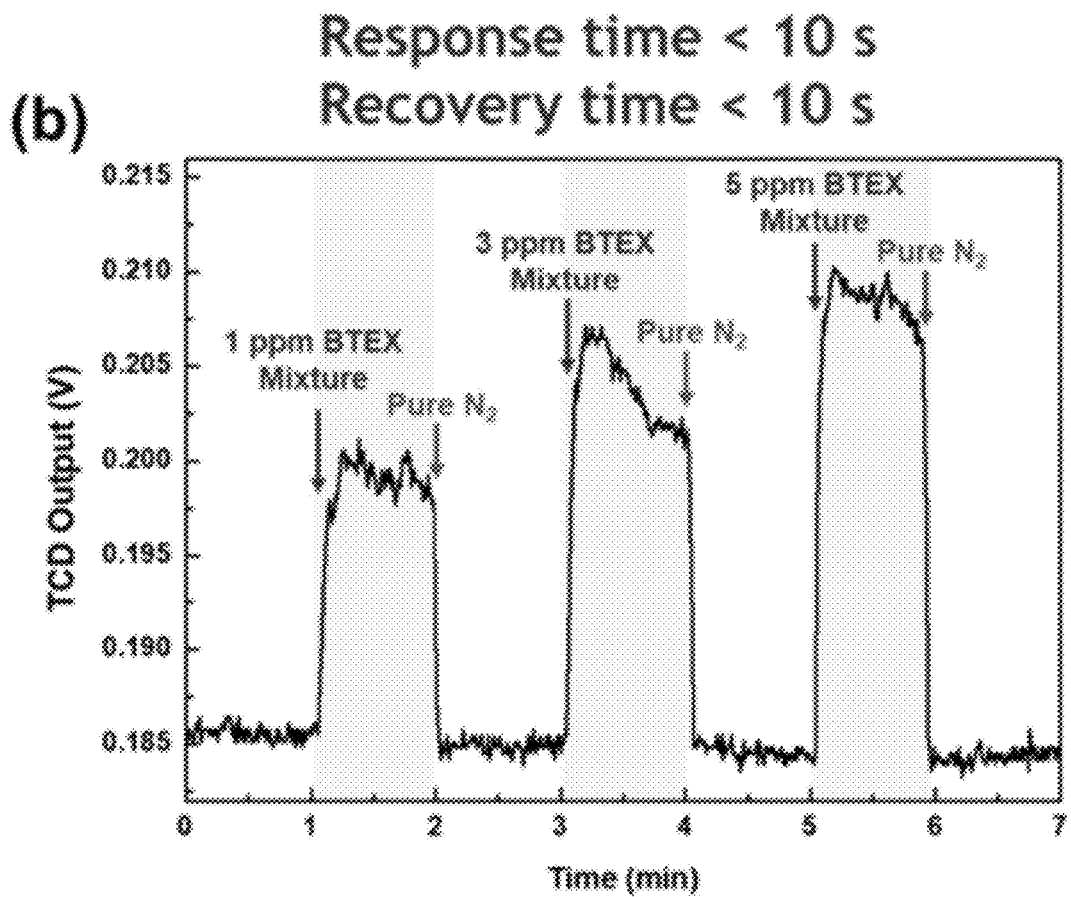
FIG. 10B is a view illustrating a response time and a recovery time of the micro thermal conductivity detection sensor.

A test showing the results of FIG. 10B was conducted under conditions described below. A BTEX gas mixture containing benzene (B), toluene (T), ethylbenzene (E), and xylene (X) each of which has a concentration of 5 ppm was used as a sample gas. A gas mixer was used to produce a first BTEX gas mixture with a concentration of 1 ppm, a second BTEX gas mixture with a concentration of 3 ppm, and a third BTEX gas mixture with a concentration of 5 ppm. The temperature of the heating resistor was maintained at 150° C. and the power consumption was about 50 mW.

In these conditions, when each of the first to third BTEX gas mixtures which differ in concentration passes the heating resistor, the thermal conductivity of the heating resistor changes and the resistance of the heating resistor instantaneously changes. The change in resistance is measured as a voltage signal. Nitrogen was used as a purging gas. Each of the first to third BTEX gas mixtures and the purging gas were alternately introduced with a time interval of 1 minute. The response time and the recovery time with respect to each of the first to third BTEX gas mixtures were about 10 seconds.

As described above, each of the components contained in the fluid passing through the separation column was detected by the micro sensing unit 140 at a different time because the retention times of the components differ. The detection results were output to the display unit 150.

The analysis results obtained by the micro sensing unit 140 can be output to the display unit 150. The display unit 150 shows the measurement results measured by the sensing unit 140 in the form of characters, numerals, graphics, diagrams, or any combination thereof. The display unit 150 may be a touch screen panel or a screen panel with a separate input means. Therefore, a user can control and operate the micro gas chromatography system 100 using the input means.

Figure 11A:
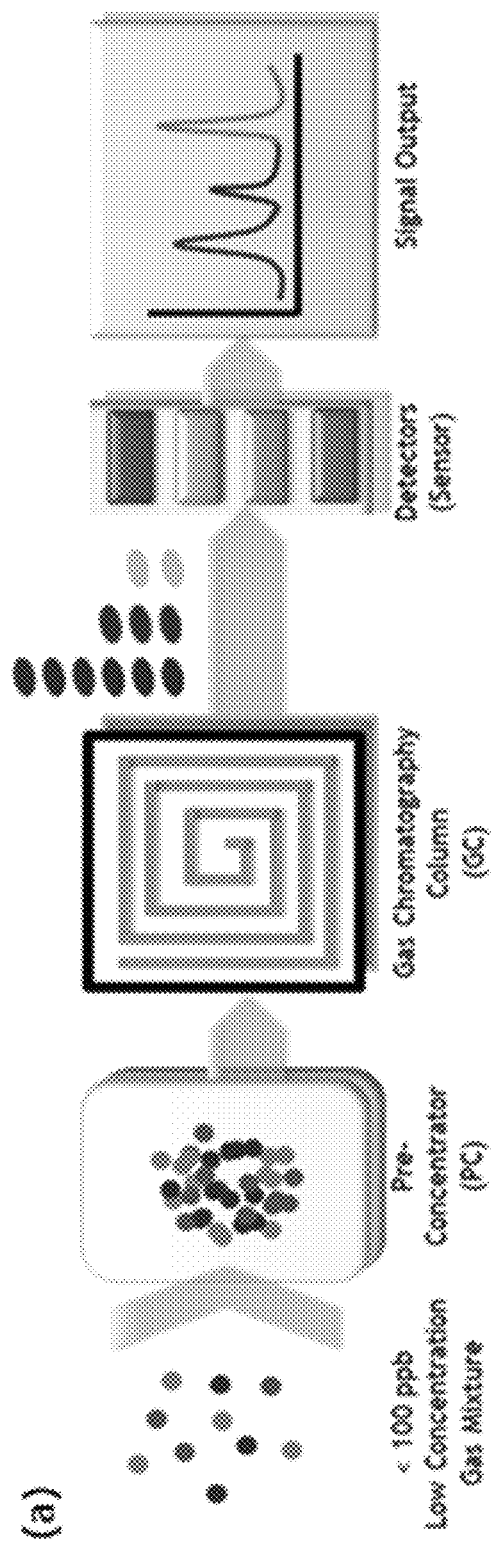
FIG. 11A is a schematic view illustrating a process in which an analyte gas is concentrated, separated, and detected by a micro gas chromatography system according to an embodiment of the present invention.
Figure 11B:
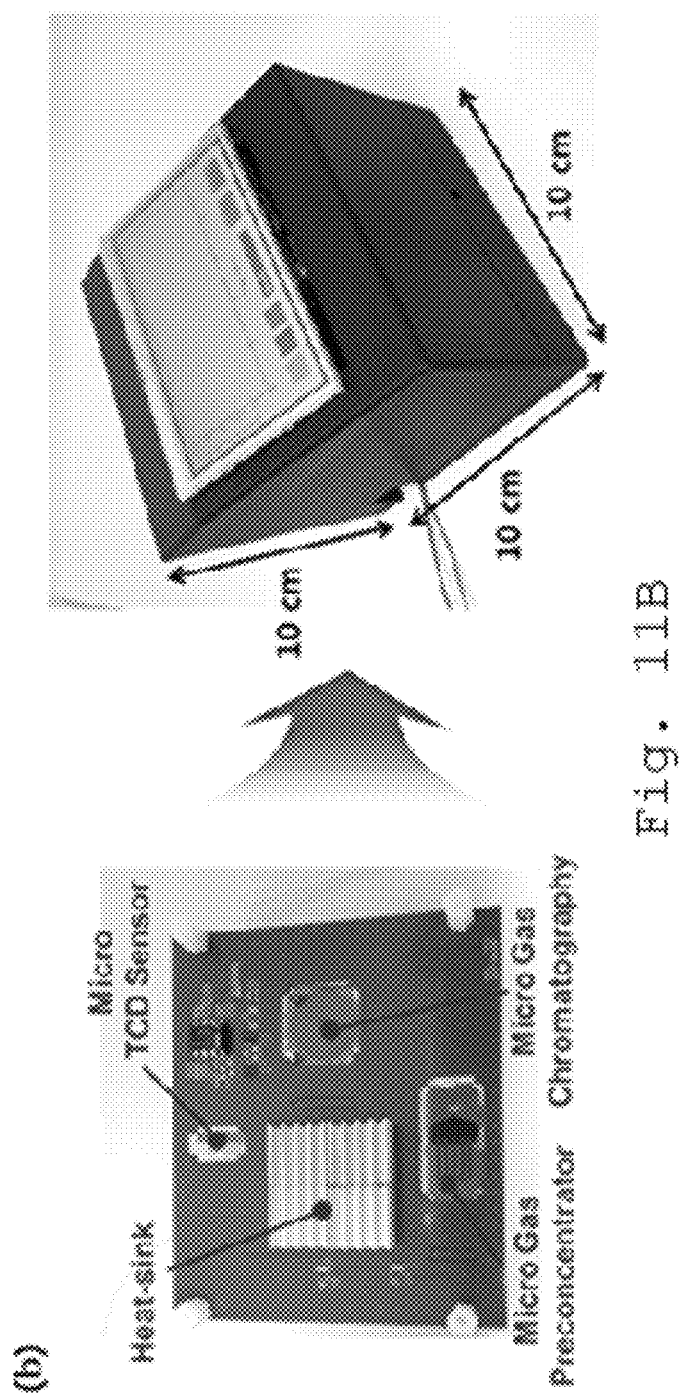
FIG. 11B is a view illustrating a setup process for analytical testing based on a micro gas chromatography system.

As illustrated in FIGS. 11A and 11B, a micro gas chromatography system according to the present invention combines a micro gas preconcentrator chip capable of concentrating a trace-level analyte gas to a higher concentration that is detectable, a micro gas chromatography chip capable of improving the separation performance for each analyte gas by effectively distributing the retention times by controlling a pressure drop, a highly sensitive and responsive thermal conductivity detection sensor having a short response time and a short recovery time, and a display unit, thereby effectively concentrating, separating, and detecting each trace-level analyte gas contained in a gas mixture.

Figure 12A:
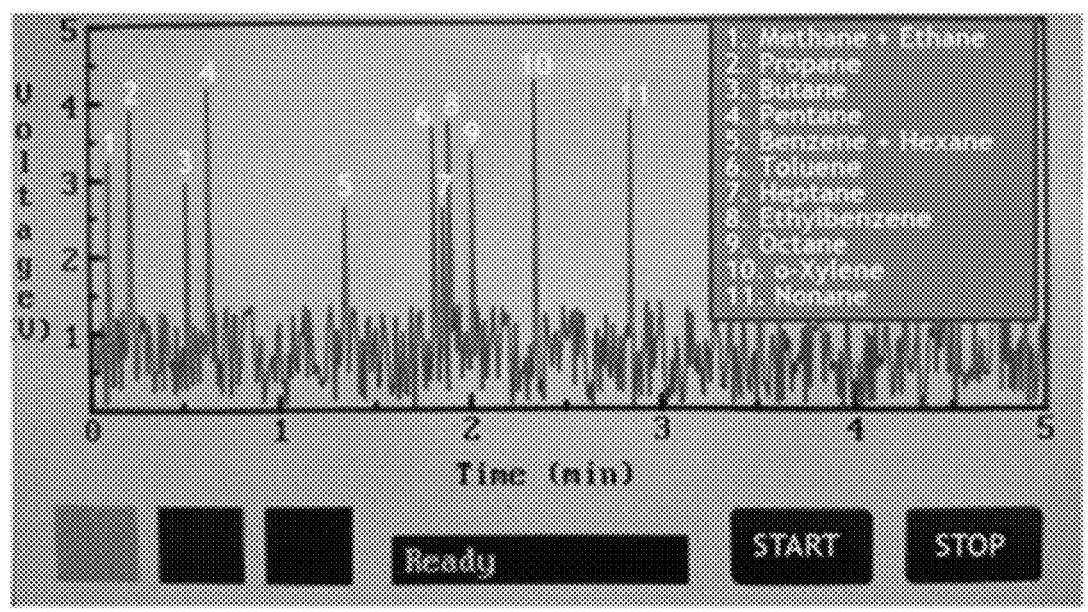
FIG. 12A is a graph showing the analysis results of the components of a gas mixture including alkane compounds and aromatic compounds.
Figure 12B:
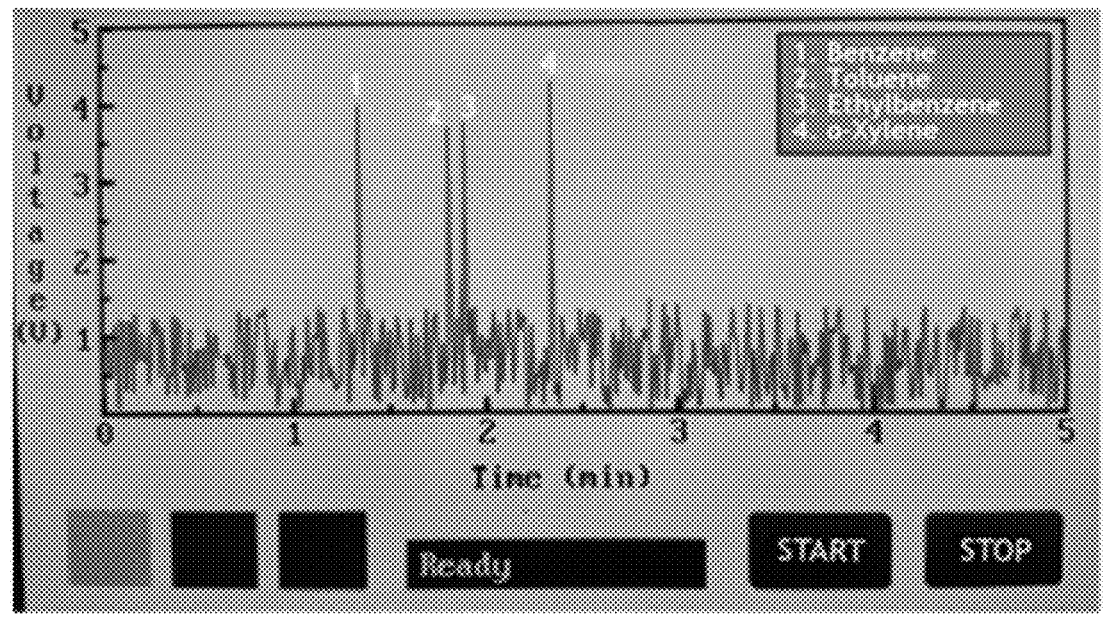
FIG. 12B is a graph showing the analysis results of the components of a gas mixture including aromatic compounds.

FIGS. 12A and 12B illustrate test results showing concentration, separation, and detection performances of a micro gas chromatography system according to the present invention. In the test, a low-concentration gas mixture was used as a test sample. The micro gas chromatography system is composed of a fluid feeder, a micro gas preconcentrator chip, a micro gas chromatography chip, a highly sensitive and responsive micro thermal conductivity detection sensor, and a display unit.

The test associated with FIGS. 12A and 12B was conducted with a 5-ppm gas mixture containing four or thirteen volatile organic compounds (VOCs). The 5-ppm gas mixture was diluted with a nitrogen gas to be a 100-ppb gas mixture which was used as a test sample.

The micro gas chromatography chip was maintained at a temperature of 60° C., and the micro thermal conductivity detection sensor was maintained at a temperature of 150° C. A sample gas Tedlar® bag and a carrier gas Tedlar® bag were connected to the micro gas chromatography system, and the test sample was concentrated by the micro gas preconcentrator at room temperature for 20 minutes.

Specifically, the 100-ppb test sample was introduced into the micro gas chromatography system for 20 minutes by using a mini pump. At this time, a first valve was moved from the sample gas Tedlar® bag to the micro gas preconcentrator, and a second valve was moved from the micro gas preconcentrator to a vent side. The pump was stopped and the micro gas preconcentrator was heated for one minute. When the temperature of the micro gas preconcentrator reaches about 250° C., the pump resumed its operation, thereby introducing the carrier gas and causing the concentrated gas to be desorbed. At this time, the first valve was moved from the carrier gas Tedlar® bag to the micro gas preconcentrator and the second valve was moved from the micro gas preconcentrator to the micro gas chromatography.

Next, the desorbed concentrated gas was transported to the micro gas chromatography, and separation occurs in the micro gas chromatography separation column maintained at a temperature of 60° C. The gas components left the column and then moved toward the heating resistor of the micro thermal conductivity detection sensor. The gas components caused changes in temperature (i.e. changes in resistance) of the heating resistor at different times. Electrical voltage signals that are representations of the changes in resistance are shown in FIGS. 12A and 12B.

FIG. 12A shows the test results of separation of a gas mixture composed of alkane and aromatic compounds and FIG. 12B shows the test results of separation of a gas mixture composed of aromatic compounds.

The operation of the micro gas chromatography system 100 according to the present invention involves the temperature control of the micro gas preconcentrator chip 120 and the micro gas chromatography chip 130 for accurate analysis. To achieve this, each of the micro gas preconcentrator chip 120 and the micro gas chromatography chip 130 is provided with a micro heater and a temperature sensor.

That is, the internal temperatures of the micro gas preconcentrator chip 120 and the micro gas chromatography chip 130 are controlled by using the micro heaters and the temperature sensors. The micro heaters and the temperature sensors are not particularly limited if they have a size mountable on the micro gas preconcentrator chip 120 or the micro gas chromatography chip 130. The micro heater and the temperature sensor can be mounted on the upper surface, the lower surface, or the side surface of the micro gas preconcentrator chip or the micro gas chromatography chip.

The micro heater is made of any one metal selected from the group consisting of gold (Au), tungsten (W), platinum (Pt), and palladium (Pd), but the material of the micro heater is not limited thereto. The micro heater is fabricated through sputtering, e-beam evaporation, or thermal evaporation.

Figure 13:
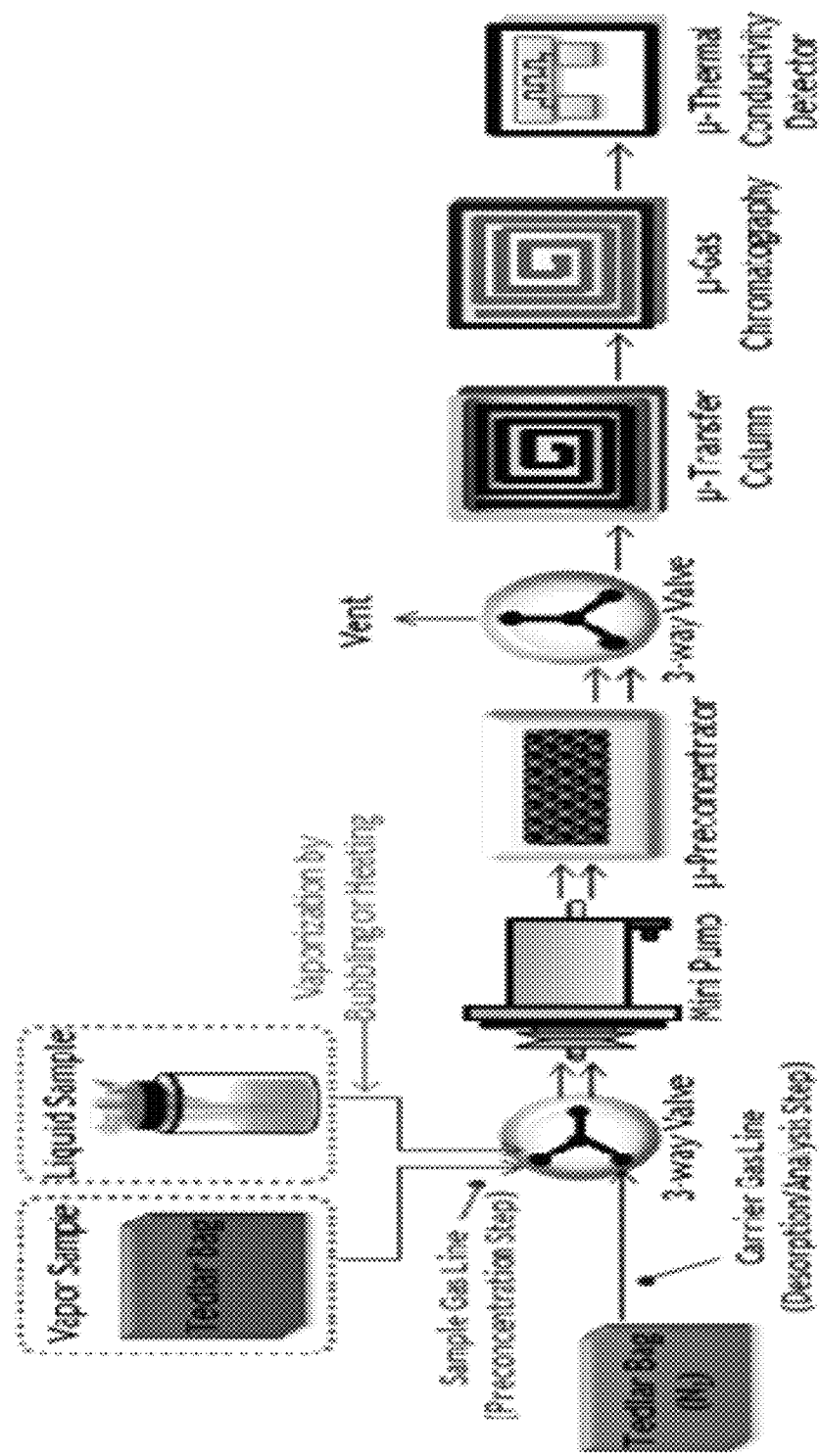
FIG. 13 is a schematic diagram illustrating a process in which an analyte gas is concentrated, separated, and detected by a micro gas chromatography system equipped with a replaceable micro gas preconcentrator module and a micro transfer column, according to an embodiment of the present invention.
Figure 14A:
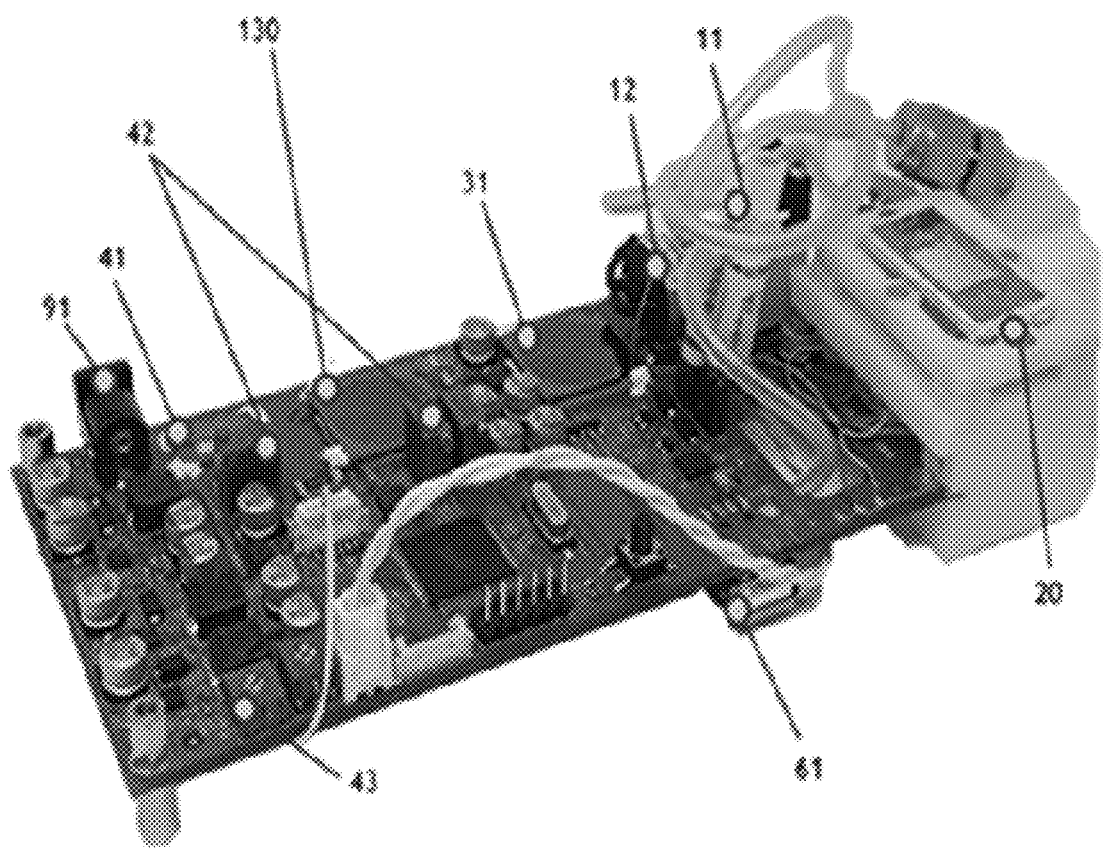
FIGS. 14A, 14B, and 14C are photographs respectively illustrating the internal hardware construction and the external appearance of a micro gas chromatography system equipped with a replaceable micro gas preconcentrator module and a micro transfer column, according to an embodiment of the present invention.
Figure 14B:
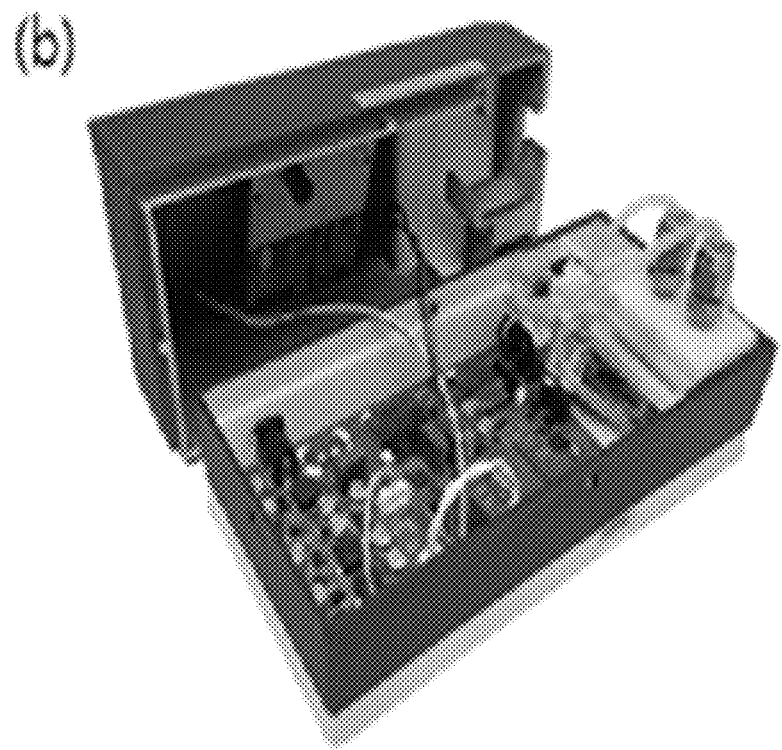
Figure 14C:
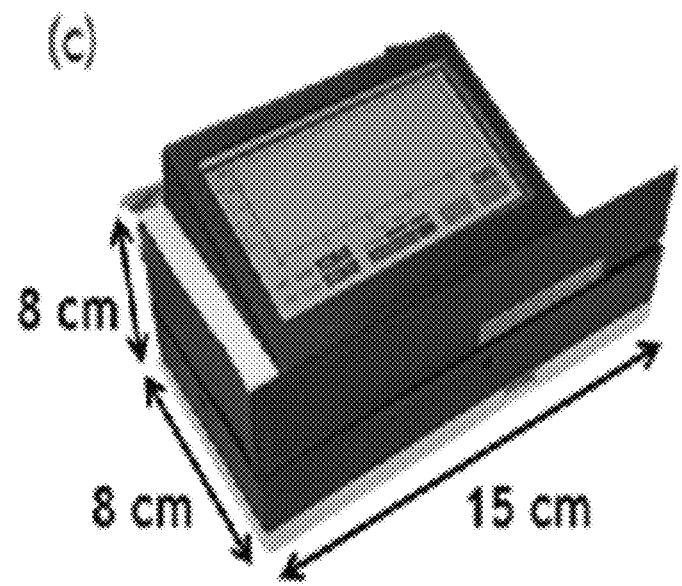

The micro gas chromatography system 100 according to the present invention further include a micro transfer column positioned at the preceding stage of the micro gas chromatography chip 130 as illustrated in FIG. 13. The micro transfer column serves to maintain the analyte gas at a constant temperature or adjusts the temperature of the analyte gas. During analysis, the micro transfer column minimizes the influence of the temperature of the sensor on the signal by adjusting the temperature of the heater and the temperature of the analyte gas because the temperature of the analyte gas descends while the analyte gas passes through the channel.

Each of the analyte gases (components) in the fluid, which is concentrated by and then desorbed from the micro gas preconcentrator chip 120, passes through the micro transfer column installed at the preceding stage of the micro gas chromatography chip 130 to maintain constant temperature such that each of the analyte gases has a preset temperature when leaving the micro transfer column. In this state, each of the analyte gases passes through the micro gas chromatography chip 130 and reaches the micro sensing unit 140.

The micro sensing unit 140 may include a micro thermal conductivity detection sensor. Since the micro thermal conductivity detection sensor outputs a concentration value that varies depending on the temperature of the analyte gas. Therefore, it is preferable that the micro gas chromatography system 100 according to the present invention includes the micro transfer column positioned at the preceding stage of the micro gas chromatography chip 130 to maintain the analyte gas at a constant temperature.

Figure 15:
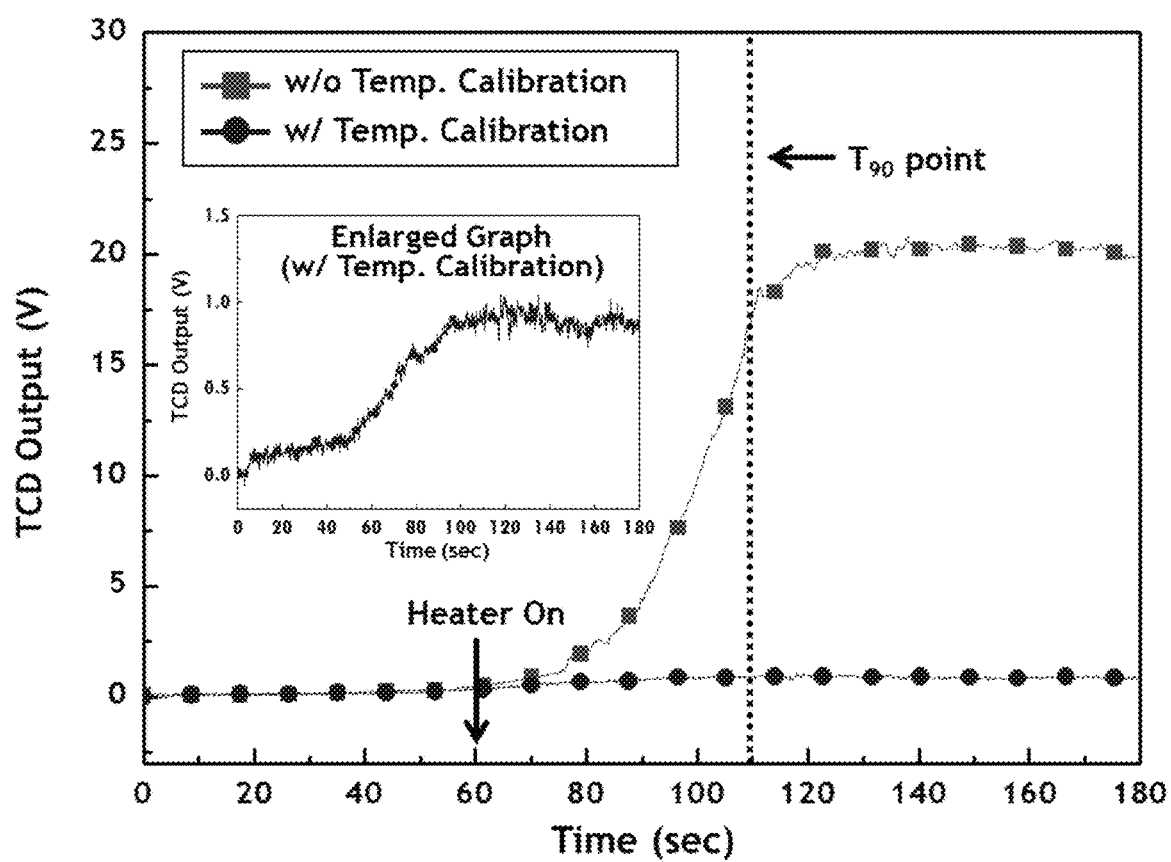
FIG. 15 is a graph showing response signals of a micro thermal conductivity detection sensor according to a change in temperature of a gas, in which a response signal of a micro gas chromatography system equipped with a micro transfer column and a response signal of a micro gas chromatography system having no micro transfer column are compared.

FIG. 15 provides results of a comparison between an output value of a thermal conductivity detection sensor of a micro gas chromatography system having a micro transfer column and an output value of a thermal conductivity detection sensor of a micro gas chromatography system having no micro transfer column. In the micro gas chromatography system having the micro transfer column, the micro thermal conductivity detection sensor outputs values that are constant because the flow of the analyte gas can be maintained at a constant temperature.

The micro transfer column includes a micro heater as a heat source, a thermoelectric element, and a temperature sensor, thereby adjusting the temperature of the analyte gas to a preset temperature.

Figure 16:
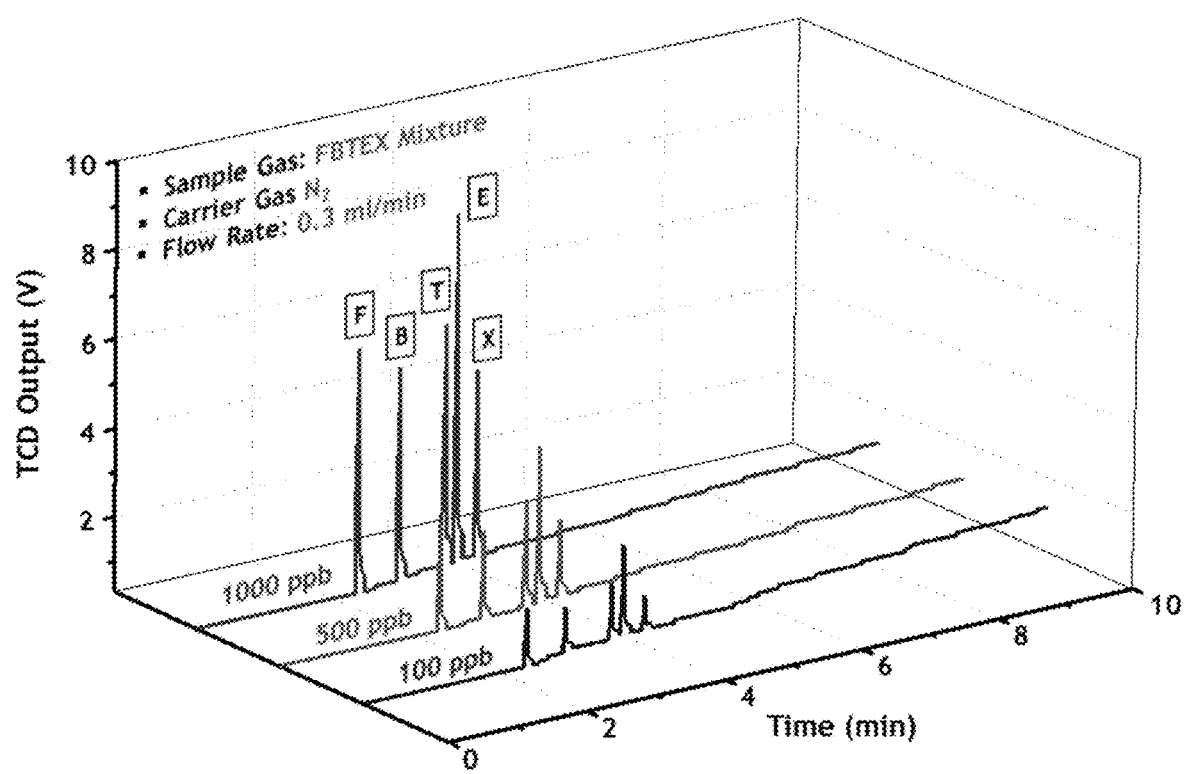
FIG. 16 is a graph showing analysis results of components of an aromatic compound gas mixture (including formaldehyde (F), benzene (B), toluene (T), ethylbenzene (E), and xylene (X)), the results being obtained by using a micro gas chromatography system equipped with a micro transfer column, according to an embodiment of the present invention.

FIG. 16 illustrates analysis results of three FBTEX gas mixtures which differ in concentration but each include the same components (i.e., formaldehyde, benzene, toluene, ethylbenzene, and xylene). The three FBTEX gas mixtures have concentrations of 100, 500, and 1000 ppb, respectively. In the test, the micro gas chromatography system 100 having the micro transfer column was used. The volume of each gas mixture (test sample) used for the test was 3 ml. The flow rate of the test sample and a carrier gas (helium) were maintained at 0.3 ml/min. A sampling process in which the components of a gas mixture are absorbed in the micro gas preconcentrator chip 120 was pertained at room temperature for 10 minutes. Next, the temperature of the micro gas chromatography separation column serving to separate a gas mixture was initially maintained at 30° C. for one minute, was then increased to 150° C. at a rate of 15° C./min, and was maintained at 150° C. for one minute for the analysis. The total analysis time was minutes including the time taken for the sampling process. Detection of each of the analyte gases (components) separated was performed by a micro thermal conductivity detection sensor serving as a sensing unit.

According to the test results illustrated in FIG. 16, a gas mixture containing five compounds including formaldehyde (F), benzene (B), toluene (T), ethylbenzene (E), and xylene (X) undergoes concentration, separation, and detection. The test results of FIG. 16 confirmed that all of the five components were well separated from the gas mixture.

Figure 17:
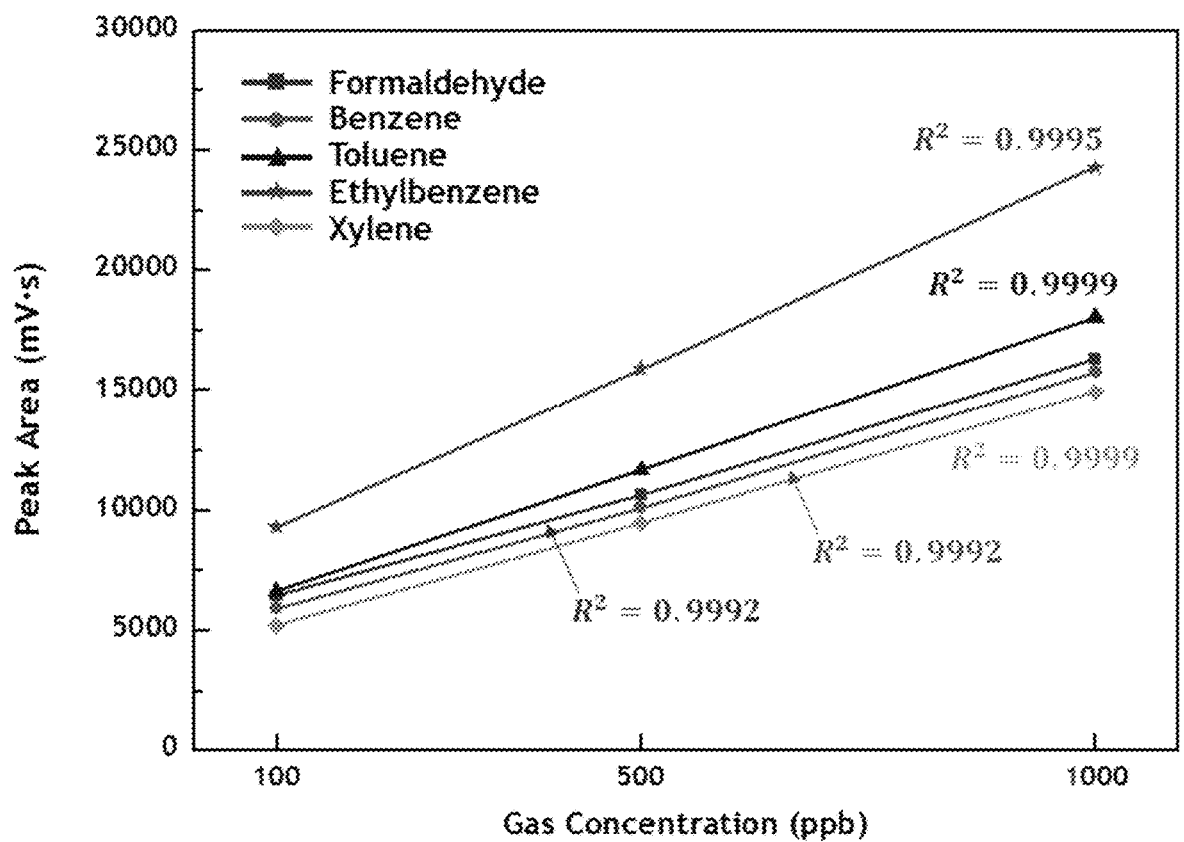
FIG. 17 is a graph showing the calculated peak areas of the components of a gas mixture (including formaldehyde (F), benzene (B), toluene (T), ethylbenzene (E), and xylene (X)), the components being separated by a micro gas chromatography system equipped with a micro transfer column, according to an embodiment of the present invention.

FIG. 17 illustrates changes in the peak areas for the respective analyte gases (respective components) at varying concentrations. The peak areas were calculated on the basis of the test results of FIG. 16. All of the values of the peak areas for formaldehyde (F), benzene (B), toluene (T), ethylbenzene (E), and xylene (X) show linear increases with concentration. The calculation of the R square value on the basis of the graph in which the values of the peak areas are plotted for the respective concentrations produced a value of 1.

The controller 160 includes an integrated circuit (IC) chip or a microcontroller unit (MCU) and controls the overall operation of the micro gas chromatography system 100 according to the present invention. Specifically, the controller 160 performs a switching control for the pump and a temperature control for the micro heater. That is, the controller 160 switches on and off the pump and controls the operation of the micro heaters installed in the micro gas preconcentrator chip 120 and the micro gas chromatography chip 130 on the basis of data such as time and the internal temperatures of the preconcentrator and the separation column, which are detected by the temperature sensors of the micro gas preconcentrator chip 120 and the micro gas chromatography chip 130.

The communication unit 170 performs wired or wireless communication. The wireless communication is performed using a short-range wireless communication scheme, a long-range wireless communication scheme, or a combination thereof. Examples of the short-range wireless communication scheme include Bluetooth, NFC, and an infrared communication scheme. Examples of the long-range wireless communication scheme includes 3G, 4G, LTE, and Wibro classified as a mobile communication type and WiFi classified as a wireless Internet communication type. It is, of course, possible to use any other wireless communication method capable of transmitting a large volume of data.

Therefore, an operator can monitor the analysis results of the micro gas chromatography system 100 of the present invention from his or her smart communication device such as a Smartphone or a tablet PC. That is, an operator can conveniently check the analysis results of the micro gas chromatography system 100. Furthermore, since the analysis results can be transmitted to a remote management system through the communication unit, an operator can check the analysis results anytime and anywhere.

The well-known parts or constructions such as a power supply, a casing, and the like are omitted in the description because they do not constitute the gist of the present invention.

While the present invention has been described with reference to exemplary embodiments illustrated in the accompanying drawings, those skilled in the art will appreciate that the exemplary embodiments are presented only for illustrative purposes. On the contrary, it will be understood that various modifications and equivalents to the exemplary embodiments are possible. Accordingly, the technical scope of the present invention should be defined by the following claims.

What is claimed is:

1. A micro gas chromatography system comprising:
a fluid feeder configured to feed a fluid composed of a carrier gas and a gas mixture containing at least one analyte component to a micro gas preconcentrator chip;
the micro gas preconcentrator chip configured to concentrate and desorb the analyte component contained in the fluid composed of the carrier gas and the gas mixture;
a micro gas chromatography chip into which the fluid containing the analyte component desorbed from the micro gas preconcentrator chip is introduced and from which the analyte component contained in the fluid is separately eluted,
a micro transfer column provided at a preceding stage of the micro gas chromatography chip, wherein the micro transfer column includes a micro heater as a heat source, a thermoelectric element, and a temperature sensor for adjusting temperature of the analyte component to a preset temperature; and
a micro sensing unit including a gas detector configured to detect the analyte component eluted from the micro gas chromatography chip,
wherein,
the micro gas chromatography chip includes a micro separation column having a rectangular, circular, or serpentine micro-channel formed in one surface of a substrate, the micro-channel having a plurality of bumps formed on an inside wall surface thereof, wherein some of the bumps are formed on a first side of the inside wall surface of the micro-channel, the other bumps are formed on a second side that is opposite to the first side, and the bumps formed on the first side and the bumps formed on the second side are alternate with each other,
the gas detector is a micro thermal conductivity detection sensor, and the micro thermal conductivity detection sensor is sealed using a glass cover, and includes a heating resistor on an inner periphery, wherein the heating resistor has a serpentine shape, and
the micro gas preconcentrator chip is mounted on a replaceable micro gas preconcentrator module,
wherein,
the replaceable micro gas preconcentrator module comprises an upper cover, a lower cover, a tray, and a lower body,
the upper cover comprises a fluid inlet and a fluid outlet, wherein the replaceable micro gas preconcentrator module is configured such that the fluid from the fluid feeder enters the fluid inlet and is concentrated on the micro gas preconcentrator chip and the analyte is desorbed from the micro gas preconcentrator chip and discharged through the fluid outlet to the micro gas chromatography chip,
the replaceable micro gas preconcentrator module is configured such that the micro gas preconcentrator chip is positioned between the upper cover and the lower cover and is supported on the tray, and the tray is mounted on the upper surface of the lower cover, and
the replaceable micro gas preconcentrator module and the micro gas preconcentrator chip are assembled by stacking in the order of the lower body, the lower cover, the tray, the micro gas preconcentrator chip, and the upper cover.

2. The micro gas chromatography system according to claim 1, wherein the micro gas preconcentrator chip uses at least one of a carbon nanotube foam, a single walled carbon nanotube, a graphitized carbon black, a carbon molecular sieve, a graphitized polymer carbon, a carbon-silica composite, activated carbon, biochar, silica gel, fullerenes, molecular organic frameworks, and any combination thereof, as an absorbent used to concentrate the analyte component.

3. The micro gas chromatography system according to claim 1, further comprising a micro heater and a temperature sensor provided on at least one of an upper surface, a lower surface, and a side surface of the micro gas preconcentrator chip.

4. The micro gas chromatography system according to claim 1, wherein the micro-channel has a channel width of 140 to 200 um and a channel depth of 300 to 450 μm.

5. The micro gas chromatography system according to claim 1, wherein an r2/r1 ratio that is a ratio of a distance r2 from a position of the inside wall surface to a top of the bump that faces the position, with respect to a height r1 of the bump formed on the wall surface of the micro-channel ranges from 1.0 to 1.5.

6. The micro gas chromatography system according to claim 1, wherein a dill ratio which is a ratio of a pitch of the bumps with respect to a height r1 of the bump ranges from 3 to 5.

7. The micro gas chromatography system according to claim 1, wherein the micro gas chromatography chip includes a stationary phase functioning to separate the analyte component, and the stationary phase is formed from polyethylene glycol, a single walled carbon nanotube, polydimethylsiloxane, polyethyleneimine, diethylene glycol succinate, dinonyl phthalate, ethylene glycol adipate, β,β-oxydipropionitrile, or any combination thereof.

8. The micro gas chromatography system according to claim 1, further comprising a micro heater and a temperature sensor formed on at least one of an upper surface, a lower surface, or a side surface of the micro gas chromatography chip.

9. The micro gas chromatography system according to claim 1, further comprising a controller for controlling operations of the fluid feeder, the micro gas preconcentrator chip, the micro gas chromatography chip, and the micro sensing unit.

10. The micro gas chromatography system according to claim 1, further comprising a display unit that outputs analysis results obtained by the micro sensing unit by using a numeral, a character, a diagram, a graphic, or any combination thereof.

11. The micro gas chromatography system according to claim 1, further comprising a communication unit configured to receive statistical data or platform control and setting signals and transmit data of the analysis results produced by the micro sensing unit to an external device.

* * * * *